United States Patent [19]

Nagano

[11] Patent Number: 5,757,755
[45] Date of Patent: May 26, 1998

[54] DATA READING/WRITING OPTICAL HEAD WITH HOLOGRAPHIC COUPLER

[75] Inventor: Tsuyoshi Nagano, Tokyo, Japan

[73] Assignee: NEC Corporation, Japan

[21] Appl. No.: 700,887

[22] Filed: Aug. 21, 1996

[30] Foreign Application Priority Data

Aug. 24, 1995 [JP] Japan .................... 7-215955

[51] Int. Cl.⁶ ........................................... G11B 7/12
[52] U.S. Cl. ................... 369/103; 369/109; 369/112; 369/44.12
[58] Field of Search ........................ 369/103, 112, 369/110, 109, 44.11, 44.12, 44.14

[56] References Cited

U.S. PATENT DOCUMENTS 5,450,237  9/1995  Yoshida et al. ............. 369/112 X
5,481,516  1/1996  Kim .......................... 369/112 X

FOREIGN PATENT DOCUMENTS 2-46536  2/1990  Japan ........................ G11B 7/12

OTHER PUBLICATIONS

"Bifocal Focusing Grating Coupler For Optical Disk Pickup" H. Sunagawa et al; pp. 2–280; date unknown. National Conference Record, Optical & Radio Wave Electronics, The Institute of Electronics and Communication Engineers of Japan.

"Integrated–Optic Disc Pickup using Fiber–Linked Light Source" Suhara et al.

Optical Memory Symposium; Jul. 15, 1992; Pacifico Yokohama, pp. 109–110.

*Primary Examiner*—Muhammad N. Edun
*Attorney, Agent, or Firm*—Hayes, Soloway, Hennessey, Grossman & Hage, P.C.

[57] ABSTRACT

The optical head has a radiating light source for emitting a beam, and a finite lens for focusing the beam onto a recording medium, and a slab type waveguide for guiding light. The optical head includes a holographic coupler and a plurality of photo-detectors. The holographic coupler which lacks a lens effect is provided in the slab type waveguide between the radiating light source and the finite lens. The holographic coupler transmits the beam going from the radiating light source toward the finite lens and diffracts a beam returning from the finite lens toward the radiating light source after being reflected at the recording medium. The photo-detectors detect the beam which is diffracted by the holographic coupler and coupled to and guided by the slab type waveguide. Since the holographic coupler does not have a lens effect, even if the wavelength of the light changes, there is no deviation of the position of the focused point from the optical axis within the slab type waveguide. It is possible to make various changes in the positioning of the photo-detectors and photo-detecting sections with respect to the holographic coupler.

11 Claims, 12 Drawing Sheets

DATA READING/WRITING OPTICAL HEAD WITH HOLOGRAPHIC COUPLER

BACKGROUND OF THE INVENTION

(1) Field of the Invention

The present invention relates to optical heads for writing data signals in and reading data signals from optical recording media such as optical disks and optical cards.

(2) Description of the Related Art

It has been known that an optical head can be readily made compact and light by employing a slab type waveguide. As an example of a conventional optical head employing such a slab type waveguide, an optical disk pickup disclosed under the title "Bifocal Focusing Grating Coupler For Optical Disk Pickup" by H. Sunagawa et. al. in National Conference Record, Optical & Radio Wave Electronics, The Institute of Electronics and Communication Engineers of Japan, page 2–280, is shown in FIGS. 1A and 1B, a plan view and a front view thereof, respectively.

Referring to FIG. 1B, a laser beam emitted from a laser diode 101 is converted to a collimated beam by a collimating lens 102, and is focused on an optical disk 104 by a objective lens 103. The beams reflected from the optical disk 104 are transmitted through the objective lens 103 and are coupled to a slab type waveguide 105 by a grating coupler 105a. The beams guided through the slab type waveguide 105 are detected by a photo-detector 105b.

As shown in FIG. 1A, the grating coupler 105a is constituted by a region 105aa and a region 105ab. Also, the photo-detector 105b is constituted by photo-detecting sections 105ba, 105bb, 105bc and 105bd. The beam coupled at the region 105aa is focused at the center of the photo-detecting section 105ba and the photo-detecting section 105bb, and the beam coupled at the region 105ab is focused on the center of the photo-detecting section 105bc and photo-detecting section 105bd, respectively.

Where the electrical signals photoelectrically converted at the photo-detecting sections 105ba, 105bb, 105bc and 105bd are respectively signals S105ba, S105bb, S105bc and S105bd, a focusing error signal is given as (S105ba−S105bb−S105bc+S105bd) by a known Foucault method, and a tracking error signal is given as (S105ba+S105bb−S105bc−S105bd) by a known push-pull method.

Where a point light source is placed at the center of the photo-detecting section 105ba and the photo-detecting section 105bb, and the light emitted from this point light source is guided to the slab type waveguide 105, the light thus guided interferes with the light emitted from the laser diode 101 and converted to the collimated beam by the collimating lens 102 whereby interference fringes are generated in the slab type waveguide 105. The region 105aa shows irregularities (concavities or convexities) of a dielectric corresponding to the interference fringes. Also, where a point light source is placed at the center of the photo-detecting section 105bc and the photo-detecting section 105bd, and the light emitted from this point light source is guided to the slab type waveguide 105, the light thus guided interferes with the light emitted from the laser diode 101 and converted to the collimated beam by the collimating lens 102 whereby interference fringes are generated in the slab type waveguide 105. The region 105ab shows irregularities (concavities or convexities) of a dielectric corresponding to the interference fringes.

The slab type waveguide 105 is fabricated through a method including a process for forming by sputtering a core of #7059 glass on a cladding of a Pyrex glass and a process of forming a grating coupler 105a wherein, on a silicon nitride thin film formed by a plasma chemical vapor deposition (PCVD), a resist pattern formed by an electron beam writing (EB writing) is transferred by a reactive ion etching (RIE) method.

Next, another example of a conventional optical head using a slab type waveguide is explained. FIG. 2 schematically shows, as such an example, under the title "Integrated-Optic Disc Pickup using Fiber-Linked Light Source", on pages 109 through 110 of the paper presented at the Optical Memory Symposium of Jul. 15, 1992, Pacifico Yokohama, Japan.

Referring to FIG. 2, a beam emitted from a semiconductor laser diode 101 is coupled by an optical fiber 106 to the slab type waveguide 107. The beam having been guided through the slab type waveguide 107 is decoupled from the slab type waveguide 107 by a grating coupler 107a, and is focused on an optical disk 104. The beam reflected from the optical disk 104 is coupled to the slab type waveguide 107 by the grating coupler 107a. The beam guided through the slab type waveguide 107 is divided by a twin beam splitter 107b into two beams which are detected at a photo-detector 107c.

The photo-detector 107c is constituted by photo-detecting sections 107ca, 107cb, 107cc and 107cd. Where the electrical signals photoelectrically converted at the photo-detecting sections 107ca, 107cb, 107cc and 107cd are respectively signals S107ca, S107cb, S107cc and S107cd, a focusing error signal is given as {(S107ca−S107cb)−(S107cc−S107cd)}, and a tracking error signal is given as {(S107ca+S107cb)−(S107cc+S107cd)}.

The slab type waveguide 107 is fabricated by a method in which the photo-detector 107c is formed on a silicon substrate then a buffer layer of silicon oxide, a waveguide layer of #7059 glass and a cover layer of silicon oxide are sequentially deposited, and further a grating coupler 107a and a twin beam splitter 107b are formed by silicon nitride.

Next, an example of still another prior art optical head employing a slab type waveguide is explained. FIGS. 3A and 3B show this prior art example, FIG. 3A being a plan view and FIG. 3B being a front view thereof. This prior art optical head is one disclosed in Japanese Patent Application Kokai Publication No. Hei 2-46536. In the front view of the prior art optical head shown in FIG. 3B, a laser beam emitted from a semiconductor laser diode 101 is focused on an optical disk 104 by a finite lens 108 (a lens set with focused points respectively at the image point side and the object point side). The beams reflected from the optical disk 104 are coupled to a slab type waveguide 109 by a grating coupler 109a. The beams guided by the slab type waveguide 109 are decoupled from the slab type waveguide 109 by the grating coupler 109b and are detected by a photo-detector 110.

As seen in the plan view of FIG. 3A showing the slab type waveguide 109, the beams coupled at regions 109aa, 109ab, 109ac and 109ad of the grating coupler 109a are guided by the slab type waveguide 109, and are decoupled respectively at regions 109ba, 109bb, 109bc and 109bd of the grating coupler 109b. The photo-detector 110 shown in FIG. 3B is constituted by photo-detecting sections 110a, 110b, 110c and 110d, and detects the beams decoupled respectively at the regions 109ba, 109bb, 109bc and 109bd.

Where a point light source is placed at the light emitting point of the laser diode 101, and the light emitted from this point light source is caused to interfere with the light guided to the slab type waveguide 109, interference fringes are generated in the slab type waveguide 109. The regions 109aa and 109ad show irregularities (concavities or convexities) of a dielectric corresponding to the interference fringes between the beam emitted from the point light source placed immediately behind the beam-emitting point of the laser diode 101 and the beam guided through the slab type waveguide 109. The regions 109ab and 109ac show, in terms of irregularities (concavities or convexities) of a dielectric, the interference fringes between the beam emitted from the point light source placed immediately ahead of the beam-emitting point of the laser diode 101 and the beam guided through the slab type waveguide 109.

When the optical disk 104 is positioned more remotely from the finite lens 108 than a focused point (converged point) of the finite lens 108, the focused point of the beam reflected by the optical disk 104 is deviated to the front of the beam-emitting point of the laser diode 101, thus increasing the beam coupling efficiency of the regions 109ab and 109ac. Conversely, when the optical disk 104 becomes closer to the finite lens 108 than the focused point of the finite lens 108, the focused point of the reflected beam from the optical disk 104 is deviated toward the rear of the beam-emitting point of the laser diode 101, thus increasing the beam coupling efficiency of the regions 109aa and 109ad.

This means that a focusing error signal in this case is given as (S110a−S110b−S110c+S110d), where S110a, S110b, S110c and S110d are respectively signals photoelectrically converted at the photo-detecting sections 110a, 110b, 110c and 110d. Also, a tracking error signal is given as (S110a−S110b+S110c−S110d).

The grating coupler 105a shown in FIGS. 1A and 1B has a lens effect to focus the collimated beam incident on the grating coupler 105a onto the center of the photo-detecting section 105ba and the photo-detecting section 105bb and onto the center of the photo-detecting section 105bc and the photo-detecting section 105bd. However, since the grating coupler 105a utilizes diffraction, its lens effect is strengthened when the wavelength of the light becomes long and is weakened when the same becomes short.

Thus, even when the optical disk 104 is positioned at the focal point of the objective lens 103, the grating coupler 105a causes the beam to be converged at a position ahead of the photo-detector 105b if the wavelength of the beam becomes long thus allowing the light to become incident on the photo-detecting section 105bb and the photo-detecting section 105bc. When the wavelength of the beam becomes short, the light is caused to be converge at a position behind the photo-detector 105b, and be incident on the photo-detecting section 105ba and the photo-detecting section 105bd. That is, a problem in the conventional optical head shown in FIGS. 1A and 1B is that the variation in oscillation wavelengths of the laser diode 101 causes a focus offset to occur.

In the arrangement shown in FIG. 2, the beam coupled to the slab type waveguide 107 by the grating coupler 107a is separated from the light path which transmits the beam coupled to the slab type waveguide 107 at the optical fiber 106 by a twin beam splitter 107b. However, since the twin beam splitter 107b utilizes diffraction, its deflection angle becomes large as the wavelength of the beam increases, and becomes small as the wavelength of the beam decreases.

Thus, even when the optical disk 104 is positioned at the focused point of the grating coupler 107a, if the wavelength of the beam becomes long, the twin beam splitter 107b causes the beam to be incident on the photo-detecting section 107ca and the photo-detecting section 107cd and, if the wavelength of the beam becomes short, it causes the beam to be incident on the photo-detecting section 107cb and the photo-detecting section 107cc. That is, a problem in the conventional optical head shown in FIG. 2 is that the variation in oscillation wavelengths of the laser diode 101 causes a focus offset to occur.

In the conventional optical head shown in FIGS. 3A and 3B, when the optical disk 104 deviates from the focal point of the finite lens 108, the coupling efficiency of the grating coupler 109a is changed. However, since the grating coupler 109a utilizes diffraction, even when the optical disk 104 is positioned at the focal point of the finite lens 108, the coupling efficiency of the regions 109ab and 109ac is increased if the wavelength of the beam becomes long while the coupling efficiency of the regions 109aa and 109ad is increased if the wavelength of the beam becomes short. That is, a problem in the conventional optical head shown in FIGS. 3A and 3B is that the variation in oscillation wavelengths of the laser diode 101 causes a focus offset to occur.

SUMMARY OF THE INVENTION

An object of the present invention, therefore, is to overcome the problems existing in the prior art, and to provide an optical head having a slab type waveguide in which, even if the wavelength of light changes, there is no occurrence of focus offset.

Another object of the present invention is to provide an optical head in which, even if the wavelength of the light changes, there is no deviation of the position of the focal point from the optical axis within the slab type waveguide.

Still another object of the present invention is to provide an optical head in which, even if the wavelength of the light changes, there is no movement of the focal point in a direction vertical to the optical axis within the slab type waveguide.

According to one aspect of the invention, there is provided an optical head having a light source for emitting a beam, and a converging lens for focusing the beam onto a recording medium, and a slab type waveguide for guiding light, the optical head comprising:

a holographic coupler lacking a lens effect, which is provided in the slab type waveguide between the light source and the converging lens, the holographic coupler being for transmitting a beam going from the light source toward the converging lens and diffracting a beam returning from the converging lens toward the light source after being reflected at the recording medium; and a plurality of photo-detectors which detect the beam that is diffracted by the holographic coupler and is coupled to and guided by the slab type waveguide.

According to another aspect of the invention, there is provided an optical head in which the holographic coupler includes a first region and a second region which are symmetrical with respect to an optical axis of the returning light, and the plurality of photo-detectors include at least a first photo-detector for detecting a first beam coupled to the slab type waveguide at the first region and guided by the slab type waveguide and a second photo-detector for detecting a second beam coupled to the slab type waveguide at the second region and guided by the slab type waveguide, the first beam being positioned at one of two sides with respect to the optical axis and the second beam being positioned at the other of the two sides, the first photo-detector comprising a first photo-detecting section which is provided at a position where the first beam is focused when the recording medium is at an objective point of the converging lens and which detects an amount of light at the same side as the first region with respect to the optical axis of the first beam, and a second photo-detecting section which detects an amount of light at an opposite side of the first region with respect to the optical axis of the first beam; and the second photo-detector comprising a third photo-detecting section which is provided at a position where the second beam is focused when the recording medium is at an objective point of the converging lens and which detects an amount of light at the same side as the second region with respect to the optical axis of the second beam, and a fourth photo-detecting section which detects an amount of light at an opposite side of the second region with respect to the optical axis of the second beam, whereby when output signals of the first, second, third and fourth photo-detecting sections are respectively S1, S2, S3 and S4, a focusing error signal is given as (S1−S2)+(S3−S4).

According to still another aspect of the invention, there is provided an optical head in which the plurality of photo-detectors include at least a first photo-detector and a second photo-detector for detecting a beam guided by the slab type waveguide, the first photo-detector being provided behind a position where the guided beam is focused when the recording medium is at an objective point of the converging lens, and comprising a first photo-detecting section which detects an amount of light in a vicinity of the center of the left-hand or right-hand side of the optical axis of the guided beam, and a second photo-detecting section which detects an amount of light outside of the left-hand or right-hand side of the optical axis of the guided beam; and the second photo-detector being provided behind a position where the guided beam is focused when the recording medium is at an objective point of the converging lens, and comprising a third photo-detecting section which detects an amount of light in a vicinity of the center of the left-hand or right-hand side of the optical axis of the guided beam, and a fourth photo-detecting section which detects an amount of light outside of the left-hand or right-hand side of the optical axis of the guided beam, whereby when output signals of the first, second, third and fourth photo-detecting sections are respectively S1, S2, S3 and S4, a focusing error signal is given as (S1−S2)−(S3−S4).

According to a further aspect of the invention, there is provided an optical head in which the holographic coupler includes a first region and a second region which are symmetrical with respect to an optical axis of the returning light, and the plurality of photo-detectors include at least a first photo-detector for detecting a first beam coupled to the slab type waveguide at the first region and guided by the slab type waveguide, and a second photo-detector for detecting a second beam coupled to the slab type waveguide at the second region and guided by the slab type waveguide, the first photo-detector being provided behind a position where the guided beam is focused when the recording medium is at an objective point of the converging lens, and comprising a first photo-detecting section which and which detects an amount of light in a vicinity of the center of the first beam, a second photo-detecting section which detects an amount of light at the left-hand side of the first beam, and a third photo-detecting section which detects an amount of light at the right-hand side of the first beam;

the second photo-detector being provided in front of a position where the guided beam is focused when the recording medium is at an objective point of the converging lens, and comprising a fourth photo-detecting section which detects an amount of light in a vicinity of the center of the second beam, a fifth photo-detecting section which detects an amount of light at the left-hand side of the second beam, and a sixth photo-detecting section which detects an amount of light at the right-hand side of the second beam, whereby when output signals of the first, second, third, fourth, fifth and sixth photo-detecting sections are respectively S1, S2, S3, S4, S5 and S6, a focusing error signal is given as {S4−(S5+S6)}−(S1−(S2+S3)).

According to still further aspect of the invention, there is provided an optical head in which the holographic coupler includes a first region and a second region which are symmetrical with respect to an optical axis of the returning light, and the plurality of photo-detectors include at least a first photo-detector for detecting a first beam coupled to the slab type waveguide at the first region and guided by the slab type waveguide, and a second photo-detector for detecting a second beam coupled to the slab type waveguide at the second region and guided by the slab type waveguide, the first photo-detector being provided behind a position where the guided beam is focused when the recording medium is at an objective point of the converging lens, and comprising a first photo-detecting section which detects an amount of light in a vicinity of the center of the guided beam, a second photo-detecting section which detects an amount of light at the left-hand side of the guided beam, and a third photo-detecting section which detects an amount of light at the right-hand side of the guided beam;

the second photo-detector being provided in front of a position where the guided beam is focused when the recording medium is at an objective point of the converging lens, and comprising a fourth photo-detecting section which detects an amount of light in a vicinity of the center of the guided beam, a fifth photo-detecting section which detects an amount of light at the left-hand side of the guided beam, and a sixth photo-detecting section which detects an amount of light at the right-hand side of the guided beam, whereby when output signals of the first, second, third, fourth, fifth and sixth photo-detecting sections are respectively S1, S2, S3, S4, S5 and S6, a focusing error signal is given as {S4−(S5+S6)}−{S1−(S2+S3)}.

In the optical head according to the invention, the holographic coupler lacks a lens effect, and no such element as a diffraction deflection element (deflection element using diffraction) is provided between the holographic coupler and the photo-detectors. Further, since a focusing error signal is generated in accordance with output signals of respective photo-detecting sections that constitute the first and second detectors, no utilization is made of the coupling efficiency of the holographic coupler that varies depending on the distance between the lens and the optical disk.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the accompanied drawings.

Figure 1A:
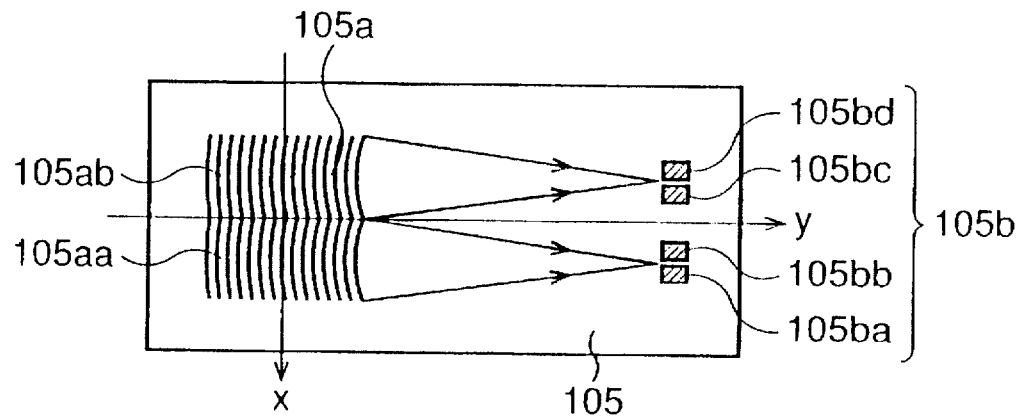
FIG. 1A is a plan view of a slab type waveguide of a conventional optical head.
Figure 1B:
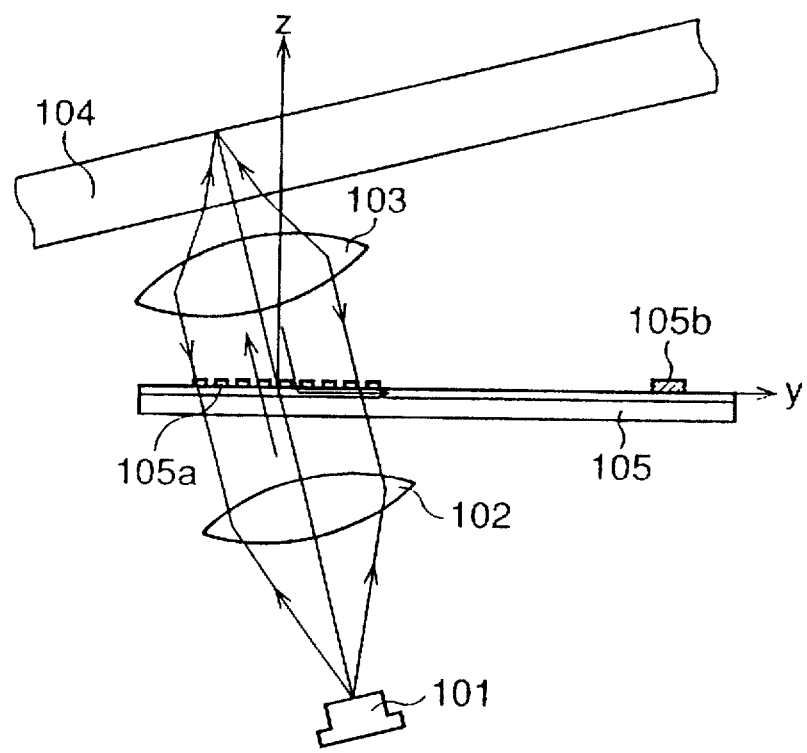
FIG. 1B is a front view of the conventional optical head shown in FIG. 1A.
Figure 2:
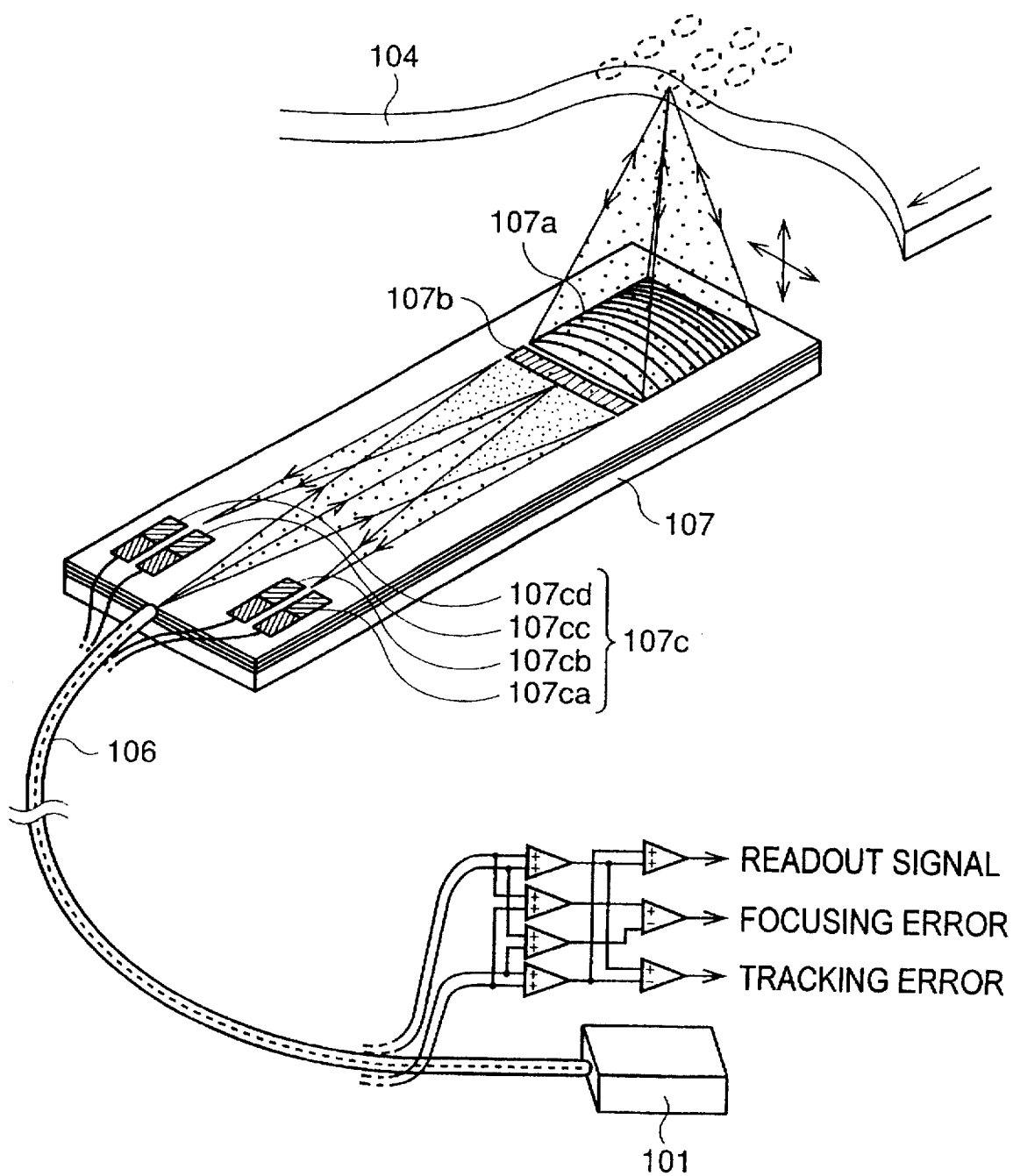
FIG. 2 is a perspective view of another conventional optical head.
Figure 3A:
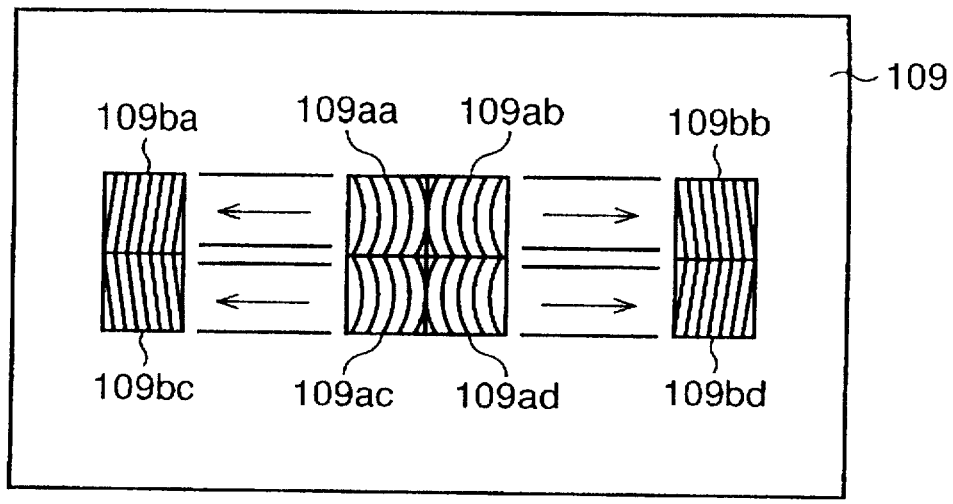
FIG. 3A is a plan view of a slab type waveguide of a still another conventional optical head.
Figure 3B:
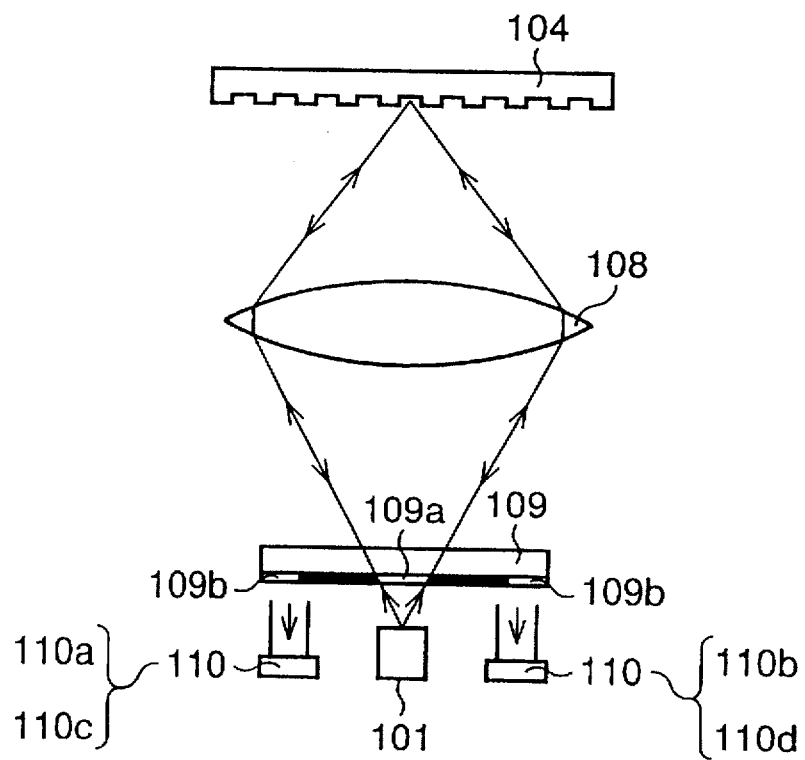
FIG. 3B is a front view of the conventional optical head shown in FIG. 3A.
Figure 4A:
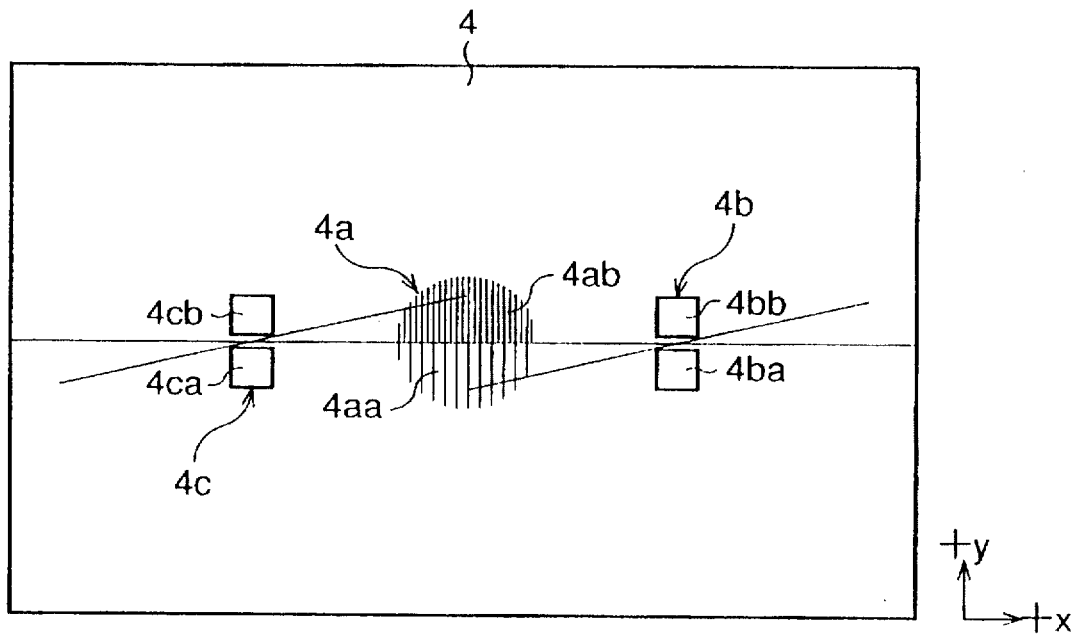
FIG. 4A is a plan view of a slab type waveguide of a first embodiment according to the invention.
Figure 4B:
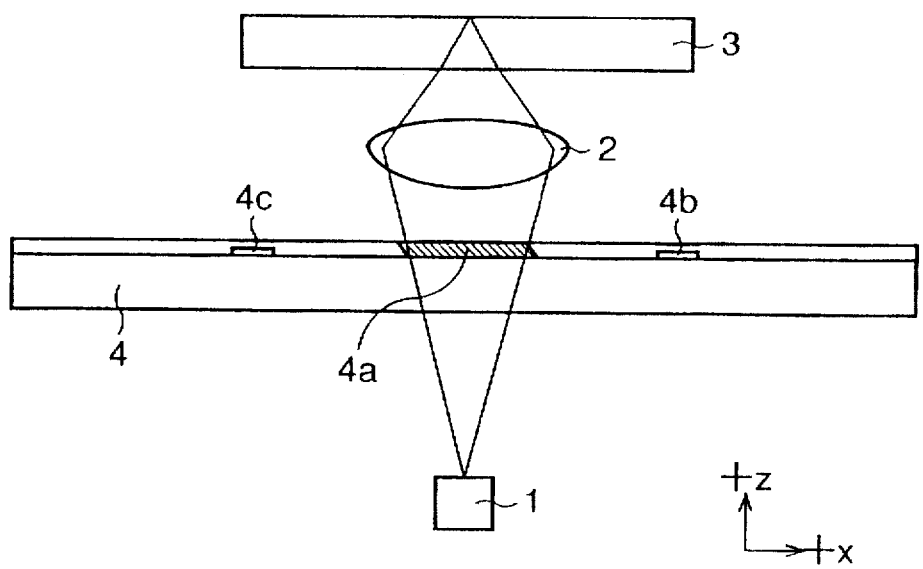
FIG. 4B is a front view of the optical head of the first embodiment shown in FIG. 4A.

FIGS. 4A and 4B show an optical head of a first embodiment, FIG. 4A being a plan view showing a slab type waveguide which is the main element of the optical head, and FIG. 4B being a front view of the optical head.

As shown in FIG. 4B, the beam emitted from laser diode 1, which is one example of a radiating light source, is transmitted through the slab type waveguide 4 and is focused on an optical disk 3 by a finite lens 2. The beam reflected from the optical disk 3 travels in a reverse direction through the same light path and is coupled to the slab type waveguide 4 by a holographic coupler 4a. The holographic coupler 4a is constituted, as shown in FIG. 4A, by two semi-circular regions 4aa and 4ab. The beam coupled to the slab type waveguide 4 at the region 4aa is guided by the slab type waveguide 4 and is detected by the photo-detector 4b. The beam coupled to the slab type waveguide 4 at the region 4ab is guided by the slab type waveguide 4 and is detected by the photo-detector 4c.

The photo-detector 4b and the photo-detector 4c are formed in such a way that the light path length from the holographic coupler 4a to the photo-detector 4b and the light path length from the holographic coupler 4a to the photo-detector 4c are respectively the same as that of the light path length from the holographic coupler 4a to the laser diode 1. Also, as shown in FIG. 4A, the photo-detector 4b is provided with photo-detecting sections 4ba and 4bb, and the photo-detector 4c is provided with photo-detecting sections 4ca and 4cb. Where the levels of the electrical signals photo-electrically converted at the photo-detecting sections 4ba, 4bb, 4ca and 4cb are respectively signals S4ba, S4bb, S4ca and S4cb, a focusing error signal is given as {(S4ba−S4bb)−(S4ca−S4cb)}, and a tracking error signal is given as {(S4ba+S4bb)−(S4ca+S4cb)}. Also, reproduction signals of the data signals recorded in the optical disk 3 are given as (S4ba+S4bb+S4ca+S4cb).

Here, the region 4aa of the holographic coupler 4a is a region in which the interference fringe generated on the slab type waveguide 4 by the beam converged on the imaging point of the finite lens 2 and the beam guided by the slab type waveguide 4 in a +x direction and focused at the center of the photo-detecting section 4ba and the photo-detecting section 4bb, is recorded on the slab type waveguide 4 as a volume hologram. When the focused beam to be incident at the imaging point of the finite lens 2 enters the region 4aa, this region reproduces the beam which is guided by the slab type waveguide 4 in the +x direction and focused at the center of the photo-detecting section 4ba and the photo-detecting section 4bb.

The region 4ab of the holographic coupler 4a is a region in which the interference fringe generated on the slab type waveguide 4 by the beam converged on the imaging point of the finite lens 2 and the beam guided by the slab type waveguide 4 in a −x direction and focused at the center of the photo-detecting section 4ca and the photo-detecting section 4cb, is recorded on the slab type waveguide 4 as a volume hologram. When the focused beam to be incident at the imaging point of the finite lens 2 enters the region 4ab, this region reproduces the beam which is guided by the slab type waveguide 4 in the −x direction and focused at the center of the photo-detecting section 4ca and the photo-detecting section 4cb.

Even when the light scattered from the imaging point of the finite lens 2 is incident on the regions 4aa and 4ab, the region 4aa does not reproduce the beam guided through the slab type waveguide 4 in the −x direction, and the region 4ab does not reproduce the beam guided through the slab type waveguide 4 in the +x direction because the refractive index of the cladding and that of air are different from each other.

The slab type waveguide 4 is fabricated using a process of forming a cladding by optically polishing a synthetic quartz plate, a process of forming photo-detectors 4b and 4c of polysilicon, a process of forming a core by vapor-deposition of chalcogenide, and a process of forming holographic coupler 4a by an electro-beam writing on the chalcogenide by processing an interference fringe by a computer.

Instead of using the polysilicon photo-detectors 4b and 4c to detect the guided beam, where the holographic couplers are formed at the locations of the photo-detectors 4b and 4c with the holographic coupler regions being provided correspondingly to the photo-detecting sections 4ba, 4bb, 4ca and 4cb, thus allowing the beam decoupled from each of the regions to be detected at each photo-detecting section of the photo-detector of silicon, it is possible to detect signals having higher frequencies.

In the optical head of the first embodiment shown in FIGS. 4A and 4B, the holographic coupler 4a does not have a lens effect so that, even if the oscillation wavelength of the laser diode 1 changes, there is no deviation of the position of the focused point along the optical axis within the slab type waveguide 4. Also, since no diffraction deflection element is provided between the holographic coupler 4a and the photo-detectors 4b and 4c in the optical head of the first embodiment, even if the oscillation wavelength of the laser diode 1 changes, there is no movement of the focused point in the direction vertical to the optical axis within the slab type waveguide 4. Further, in the optical head of this embodiment, since no utilization is made of coupling efficiency of the holographic coupler 4a that varies depending on the distance between the finite lens 2 and the optical disk 3, there is no occurrence of focus offset even if the oscillation wavelength of the laser diode 1 changes.

Figure 5A:
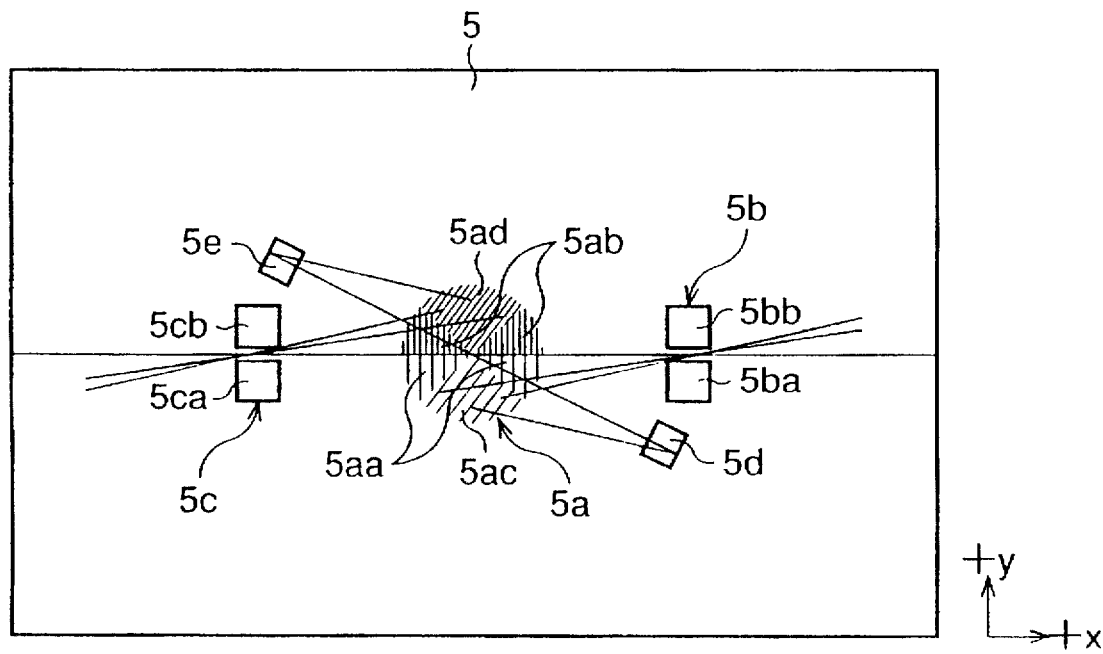
FIG. 5A is a plan view of a slab type waveguide of a second embodiment according to the invention.

Next, an optical head of a second embodiment is explained with reference to FIGS. 5A and 5B. FIG. 5A is a plan view showing a slab type waveguide which is the main element of the optical head, and FIG. 5B is a front view of the optical head.

Figure 5B:
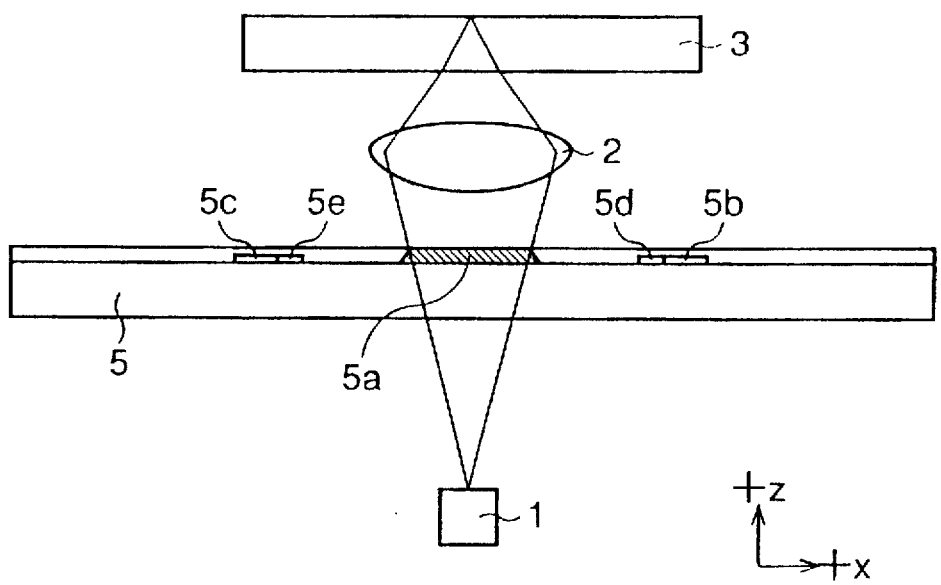
FIG. 5B is a front view of the optical head of the second embodiment shown in FIG. 5A.

As shown in FIG. 5B., the beam emitted from a laser diode 1 is transmitted through the slab type waveguide 5 and is focused on an optical disk 3 by a finite lens 2. The beam reflected from the optical disk 3 travels through the same optical path in a reverse direction and is coupled to the slab type waveguide 5 by a holographic coupler 5a. The holographic coupler 5a is constituted, as shown in FIG. 5A, by two arcuate regions 5aa, two arcuate regions 5ab, one arcuate region 5ac and one arcuate region 5ad, thus there being a total of six arcuate regions. The beam coupled to the slab type waveguide 5 at the regions 5aa of these arcuate regions is guided by the slab type waveguide and is detected by the photo-detector 5b. The beam coupled to the slab type waveguide 5 at the region 5ab is guided by the slab type waveguide 5 and is detected by the photo-detector 5c.

The photo-detector 5b and the photo-detector 5c are formed in such a way that the light path length from the holographic coupler 5a to the photo-detector 5b and the light path length from the holographic coupler 5a to the photo-detector 5c are respectively the same as that of the light path length from the holographic coupler 5a to the laser diode 1. Also, as shown in FIG. 5A, the photo-detector 5b is provided with photo-detecting sections 5ba and 5bb, and the photo-detector 5c is provided with photo-detecting sections 5ca and 5cb.

On the other hand, the beam coupled to the slab type waveguide 5 at the region 5ac of the six arcuate regions of the holographic coupler 5a is guided by the slab type waveguide 5 and detected by the photo-detector 5d. Also, the beam coupled to the slab type waveguide 5 at the region 5ad is guided by the slab type waveguide 5 and is detected by the photo-detector 5e.

Where the levels of the electrical signals photoelectrically converted at the photo-detecting sections 5ba, 5bb, 5ca and 5cb are respectively signals S5ba, S5bb, S5ca and S5cb, a focusing error signal is given as {(S5ba−S5bb)−(S5ca−S5cb)}. Also, where the level of the electrical signals photoelectrically converted at the photo-detectors 5d and 5e are respectively signals S5d and S5e, a tracking error signal is given as (S5d−S5e). The reproduction signals of the data signals recorded in the optical disk 3 are given as (S5ba+S5bb+S5ca+S5cb+S5d+S5e).

Here, the region 5aa of the holographic coupler 5a is a region in which the interference fringe generated on the slab type waveguide 5 by the beam converged on the imaging point of the finite lens 2 and the beam guided by the slab type waveguide 5 in a +x direction and focused at the center of the photo-detecting section 5ba and the photo-detecting section 5bb, is recorded on the slab type waveguide 5 as a volume hologram. When the focused beam to be incident at the imaging point of the finite lens 2 enters the region 5aa, this region reproduces the beam which is guided by the slab type waveguide 5 in the +x direction and focused at the center of the photo-detecting section 5ba and the photo-detecting section 5bb.

The region 5ab of the holographic coupler 5a is a region in which the interference fringe generated on the slab type waveguide 5 by the beam converged on the imaging point of the finite lens 2 and the beam guided by the slab type waveguide 5 in a −x direction and focused at the center of the photo-detecting section 5ca and the photo-detecting section 5cb, is recorded on the slab type waveguide 5 as a volume hologram. When the focused beam to be incident at the imaging point of the finite lens 2 enters the region 5ab, this region reproduces the beam which is guided by the slab type waveguide 5 in the −x direction and focused at the center of the photo-detecting section 5ca and the photo-detecting section 5cb.

The region 5ac of the holographic coupler 5a is a region in which the interference fringe generated on the slab type waveguide 5 by the beam converged on the imaging point of the finite lens 2 and the beam guided by the slab type waveguide 5 from the region 5ac to the center of the photo-detector 5d, is recorded on the slab type waveguide 5 as a volume hologram. When the focused beam to be incident at the imaging point of the finite lens 2 enters the region 5ac, this region reproduces the beam which is guided by the slab type waveguide 5 from the region 5ac to the center of the photo-detector 5d.

The region 5ad of the holographic coupler 5a is a region in which the interference fringe generated on the slab type waveguide 5 by the beam converged on the imaging point of the finite lens 2 and the beam guided by the slab type waveguide 5 from the region 5ad to the center of the photo-detector 5e, is recorded on the slab type waveguide 5 as a volume hologram. When the focused beam to be incident at the imaging point of the finite lens 2 enters the region 5ad, this region reproduces the beam guided by the slab type waveguide 5 from the region 5ad to the center of the photo-detector 5e.

Even when the light scattered from the imaging point of the finite lens 2 is incident on each region of the holographic coupler 5a, because the refractive index of the cladding and that of air are different from each other, the region 5aa does not reproduce the beam guided through the slab type waveguide 5 in the −x direction, the region 5ab does not reproduce the beam guided through the slab type waveguide 5 in the +x direction, the region 5ac does not reproduce the beam guided through the slab type waveguide 5 in the direction from the center of the photo-detector 5d to the region 5ac, and the region 5ad does not reproduce the beam guided through the slab type waveguide 5 in the direction from the center of the photo-detector 5e to the region 5ad.

The slab type waveguide 5 is fabricated using a process of forming a cladding by optically polishing a synthetic quartz plate, a process of forming photo-detectors 5b, 5c, 5d and 5e of polysilicon, a process of forming a core by vapor-deposition of chalcogenide, and a process of forming an holographic coupler 5a by an electro-beam writing on the chalcogenide by processing an interference fringe by a computer.

Instead of using the polysilicon photo-detectors 5b, 5c, 5d and 5e to detect the guided beam, where the holographic couplers are formed at the locations of the photo-detectors 5b, 5c, 5d and 5e with the holographic coupler regions being provided correspondingly to the photo-detecting sections 5ba, 5bb, 5ca and 5cb, thus allowing the beam decoupled from each of the regions to be detected at each photo-detecting section of the photo-detector of silicon, it is possible to detect signals having higher frequencies.

In the optical head of the second embodiment shown in FIGS. 5A and 5B, the holographic coupler 5a does not have a lens effect so that, even if the oscillation wavelength of the laser diode 1 changes, there is no deviation of the position of the focused point along the optical axis within the slab type waveguide 5. Also, since no diffraction deflection element is provided between the holographic coupler 5a and the photo-detectors 5b and 5c, even if the oscillation wavelength of the laser diode 1 changes, there is no movement of the focused point in the direction vertical to the optical axis within the slab type waveguide 5. Further, in the optical head of this second embodiment, since no utilization is made of coupling efficiency of the holographic coupler 5a that varies depending on the distance between the finite lens 2 and the optical disk 3, there is no occurrence of focus offset even if the oscillation wavelength of the laser diode 1 changes.

Figure 6A:
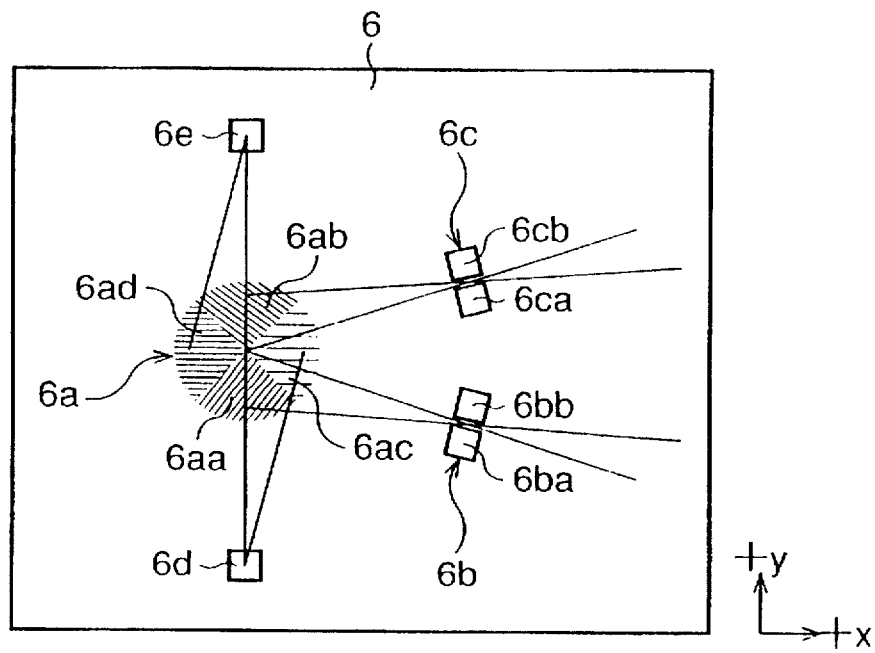
FIG. 6A is a plan view of a slab type waveguide of a third embodiment according to the invention.

Next, an optical head of a third embodiment is explained with reference to FIGS. 6A and 6B. FIG. 6A is a plan view showing a slab type waveguide which is the main element of the optical head, and FIG. 6B is a front view of the optical head.

Figure 6B:
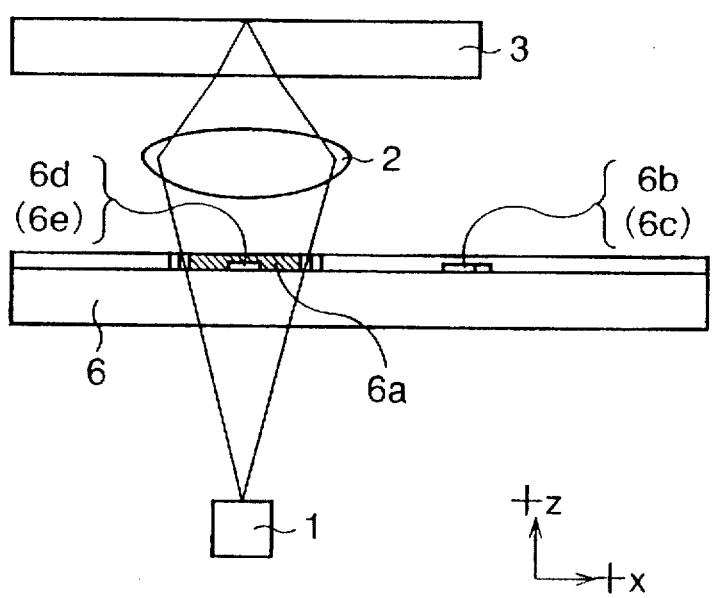
FIG. 6B is a front view of the optical head of the third embodiment shown in FIG. 6A.

In FIG. 6B, the beam emitted from the laser diode 1 is transmitted through the slab type waveguide 6 and focused on the optical disk 3 by the finite lens 2. The beam reflected from the optical disk 3 travels the same optical path in a reverse direction, and is coupled to the slab type waveguide 6 by the holographic coupler 6a. The holographic coupler 6a is constituted, as shown in FIG. 6A, by arcuate regions 6aa, 6ab, 6ac and 6ad, totaling four arcuate regions.

The beam coupled to the slab type waveguide 6 at the region 6aa of these arcuate regions is guided by the slab type waveguide 6 and is detected by the photo-detector 6b. The beam coupled to the slab type waveguide 6 at the region 6ab is guided by the slab type waveguide 6 and is detected by the photo-detector 6c. The photo-detector 6b and the photo-detector 6c are formed in such a way that the light path length from the holographic coupler 6a to the photo-detector 6b and the light path length from the holographic coupler 6a to the photo-detector 6c are respectively the same as that of the light path length from the holographic coupler 6a to the laser diode 1. Also, as shown in FIG. 6A, the photo-detector 6b is constituted by photo-detecting sections 6ba and 6bb, and the photo-detector 6c is constituted by photo-detecting sections 6ca and 6cb.

On the other hand, the beam coupled to the slab type waveguide 6 at the region 6ac of the holographic coupler 6a is guided by the slab type waveguide 6 and detected by the photo-detector 6d. Also, the beam coupled to the slab type waveguide 6 at the region 6ad of the holographic coupler 6a is guided by the slab type waveguide 6 and is detected by the photo-detector 6e.

Where the levels of the electrical signals photoelectrically converted at the photo-detecting sections 6ba, 6bb, 6ca and 6cb are respectively signals S6ba, S6bb, S6ca and S6cb, a focusing error signal is given as {(S6ba−S6bb)−(S6ca−S6cb)}. Also, where the level of the electrical signals photoelectrically converted at the photo-detecting sections 6d and 6e are respectively signals S6d and S6e, a tracking error signal is given as (S6d−S6e). The reproduction signals of the data signals recorded in the optical disk 3 are given as (S6ba+S6bb+S6ca+S6cb+S6d+S6e).

Here, the region 6aa of the holographic coupler 6a is a region in which the interference fringe generated on the slab type waveguide 6 by the beam converged on the imaging point of the finite lens 2 and the beam guided by the slab type waveguide 6 from the region 6aa to the center of the photo-detecting section 6ba and the photo-detecting section 6bb, is recorded on the slab type waveguide 6 as a volume hologram. When the focused beam to be incident at the imaging point of the finite lens 2 enters the region 6aa, this region reproduces the beam guided by the slab type waveguide 6 from the region 6aa to the center of the photo-detecting section 6ba and the photo-detecting section 6bb.

The region 6ab of the holographic coupler 6a is a region in which the interference fringe generated on the slab type waveguide 6 by the beam converged on the imaging point of the finite lens 2 and the beam guided by the slab type waveguide 6 from the region 6ab to the center of the photo-detecting section 6ca and the photo-detecting section 6cb, is recorded on the slab type waveguide 6 as a volume hologram. When the focused beam to be incident at the imaging point of the finite lens 2 enters the region 6ab, this region reproduces the beam guided by the slab type waveguide 6 from the region 6ab to the center of the photo-detecting section 6ca and the photo-detecting section 6cb.

The region 6ac of the holographic coupler 6a is a region in which the interference fringe generated on the slab type waveguide 6 by the beam converged on the imaging point of the finite lens 2 and the beam guided by the slab type waveguide 6 from the region 6ac to the center of the photo-detector 6d, is recorded on the slab type waveguide 6 as a volume hologram. When the focused beam to be incident at the imaging point of the finite lens 2 enters the region 6ac, this region reproduces the beam guided by the slab type waveguide 6 from the region 6ac to the center of the photo-detector 6d.

The region 6ad of the holographic coupler 6a is a region in which the interference fringe generated on the slab type waveguide 6 by the beam converged on the imaging point of the finite lens 2 and the beam guided by the slab type waveguide 6 from the region 6ad to the center of the photo-detector 6e, is recorded on the slab type waveguide 6 as a volume hologram. When the focused beam to be incident at the imaging point of the finite lens 2 enters the region 6ad, this region reproduces the beam guided from the region 6ad by the slab type waveguide 6 to the center of the photo-detector 6e.

Even when the light scattered from the imaging point of the finite lens 2 is incident on each region of the holographic coupler 6a, because the refractive index of the cladding and that of air are different from each other, the region 6aa does not reproduce the beam guided through the slab type waveguide 6 in the direction from the center of the photo-detecting section 6ba and the photo-detecting section 6bb to the region 6aa, the region 6ab does not reproduce the beam guided through the slab type waveguide 6 in the direction from the center of the photo-detecting section 6ca and the photo-detecting section 6cb to the region 6ab, the region 6ac does not reproduce the beam guided through the slab type waveguide 6 in the +y direction, and the region 6ad does not reproduce the beam guided through the slab type waveguide 6 in the −y direction.

The slab type waveguide 6 is fabricated using a process of forming a cladding by optically polishing a synthetic quartz plate, a process of forming photo-detectors 6b, 6c, 6d and 6e of polysilicon, a process of forming a core by vapor-deposition of chalcogenide, and a process of forming an holographic coupler 6a by an electro-beam writing on the chalcogenide by processing an interference fringe by a computer.

Instead of using the polysilicon photo-detectors 6b, 6c, 6d and 6e to detect the guided beam, where the holographic couplers are formed at the locations of the photo-detectors 6b, 6c, 6d and 6e with the holographic coupler regions being provided correspondingly to the photo-detecting sections 6ba, 6bb, 6ca and 6cb, thus allowing the beam decoupled from each of the regions to be detected at each photo-detecting section of the photo-detector of silicon, it is possible to detect signals having higher frequencies.

In the optical head of the third embodiment shown in FIGS. 6A and 6B, the holographic coupler 6a does not have a lens effect so that, even if the oscillation wavelength of the laser diode 1 changes, there is no deviation of the position of the focused point along the optical axis within the slab type waveguide 6. Also, since no diffraction deflection element is provided between the holographic coupler 6a and the photo-detectors 6b and 6c in the optical head of the third embodiment, even if the oscillation wavelength of the laser diode 1 changes, there is no movement of the focused point in the direction vertical to the optical axis within the slab type waveguide 6. Further, in the optical head of this third embodiment, since no utilization is made of coupling efficiency of the holographic coupler 6a that varies depending on the distance between the finite lens 2 and the optical disk 3, there is no occurrence of focus offset even if the oscillation wavelength of the laser diode 1 changes.

Figure 7A:
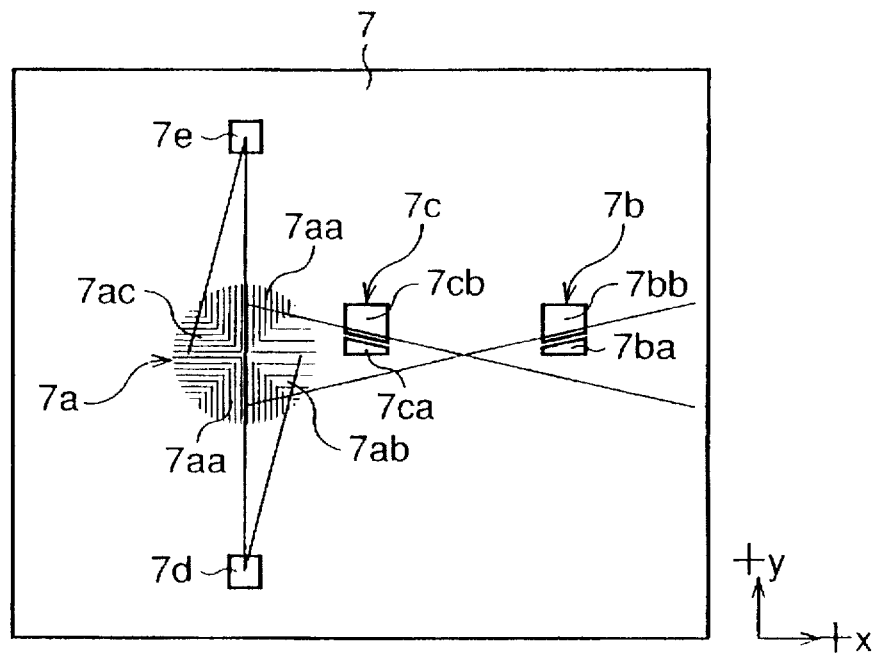
FIG. 7A is a plan view of a slab type waveguide of a fourth embodiment according to the invention.

Next, an optical head of a fourth embodiment is explained with reference to FIGS. 7A and 7B. FIG. 7A is a plan view showing a slab type waveguide which is the main element of the optical head, and FIG. 7B is a front view of the optical head.

Figure 7B:
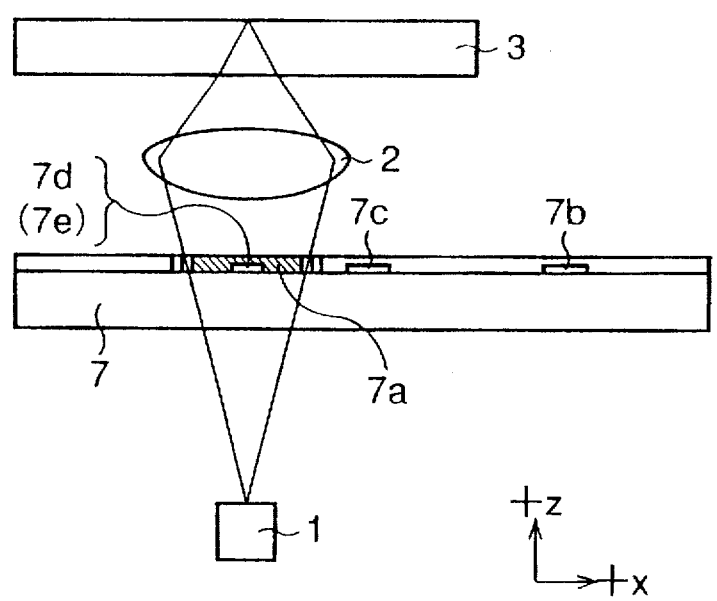
FIG. 7B is a front view of the optical head of the fourth embodiment shown in FIG. 7A.

In FIG. 7B, the beam emitted from the laser diode 1 is transmitted through the slab type waveguide 7 and focused on the optical disk 3 by the finite lens 2. The beam reflected from the optical disk 3 travels the same optical path in a reverse direction, and is coupled to the slab type waveguide 7 by the holographic coupler 7a. The holographic coupler 7a is constituted, as shown in FIG. 7A, by arcuate regions 7aa, 7aa, 7ab and 7ac, totaling four arcuate regions.

The beam coupled to the slab type waveguide 7 at two regions 7aa and 7aa of the regions 7aa, 7aa, 7ab and 7ac is guided by the slab type waveguide 7 and is detected by the photo-detector 7b that has been formed behind the position at which the guided beam is focused when the optical disk 3 is at the objective point of the finite lens 2, and is detected by the photo-detector 7c that has been formed in front of the position at which the guided beam is focused when the optical disk 3 is at the objective point of the finite lens 2.

The photo-detector 7b and the photo-detector 7c are formed in such a way that the length of the light path from the center of the photo-detector 7b and photo-detector 7c to the holographic coupler 7a is the same as the length of the light path from the laser diode 1 to the holographic coupler 7a. Also, the photo-detector 7b is constituted by a photo-detecting section 7ba which detects the amount of light in the vicinity of the center of the left-hand side of the optical axis of the guided beam, and the photo-detecting section 7bb which detects the amount of light outside of the left-hand side of the optical axis of the guided beam. Similarly, the photo-detector 7c is constituted by photo-detecting sections 7ca which detects the amount of light in the vicinity of the center at the left-hand from the optical axis of the guided beam, and the photo-detecting section 7cb which detects the amount of light outside at the left-hand from the optical axis of the guided beam. The photo-detector 7b and the photo-detector 7c may be provided at the left-hand side of the optical axis of the guided beam.

On the other hand, the beam coupled to the slab type waveguide 7 at the region 7ab of the holographic coupler 7a is guided by the slab type waveguide 7 and detected by the photo-detector 7d. Also, the beam coupled to the slab type waveguide 7 at the region 7ac of the holographic coupler 7a is guided by the slab type waveguide 7 and is detected by the photo-detector 7e.

Where the levels of the electrical signals photoelectrically converted at the photo-detecting sections 7ba, 7bb, 7ca and 7cb are respectively signals S7ba, S7bb, S7ca and S7cb, a focusing error signal is given as {(S7ba−S7bb)−(S7ca−S7cb)}. Also, where the level of the electrical signals photoelectrically converted at the photo-detectors 7d and 7e are respectively signals S7d and S7e, a tracking error signal is given as (S7d−S7e). The reproduction signals of the data signals recorded in the optical disk 3 are given as (S7ba+S7bb+S7ca+S7cb+S7d+S7e).

Here, the region 7aa of the holographic coupler 7a is a region in which the interference fringe generated on the slab type waveguide 7 by the beam converged on the imaging point of the finite lens 2 and the beam guided by the slab type waveguide 7 in a +x direction and focused at the center of the photo-detecting section 7b and the photo-detecting section 7c, is recorded on the slab type waveguide 7 as a volume hologram. When the focused beam is incident at the imaging point of the finite lens 2, the region 7aa reproduces the beam which is guided by the slab type waveguide 7 in the +x direction and focused at the center of the photo-detector 7b and the photo-detector 7c.

The region 7ab of the holographic coupler 7a is a region in which the interference fringe generated on the slab type waveguide 7 by the beam converged on the imaging point of the finite lens 2 and the beam guided by the slab type waveguide 7 in the −y direction and focused at the center of the photo-detector 7d, is recorded on the slab type waveguide 7 as a volume hologram. When the focused beam to be incident at the imaging point of the finite lens 2 enters the region 7ab, this reproduces the beam which is guided by the slab type waveguide 7 in the −y direction and focused at the center of the photo-detector 7d.

The region 7ac of the holographic coupler 7a is a region in which the interference fringe generated on the slab type waveguide 7 by the beam converged on the imaging point of the finite lens 2 and the beam guided by the slab type waveguide 7 in the +y direction and focused at the center of the photo-detector 7e, is recorded on the slab type waveguide 7 as a volume hologram. When the focused beam to be incident at the imaging point of the finite lens 2 enters the region 7ac, this region reproduces the beam which is guided by the slab type waveguide 7 in the +y direction and focused at the center of the photo-detector 7e.

Even when the light scattered from the imaging point of the finite lens 2 is incident on each region of the holographic coupler 7a, because the refractive index of the cladding and that of air are different from each other, the region 7aa does not reproduce the beam guided through the slab type waveguide 7 in the −x direction, the region 7ab does not reproduce the beam guided through the slab type waveguide 7 in the +y direction, and the region 7ac does not reproduce the beam guided through the slab type wave guide 7 in the −y direction.

The slab type waveguide 7 is fabricated using a process of forming a cladding by optically polishing a synthetic quartz plate, a process of forming photo-detectors 7b, 7c, 7d and 7e of polysilicon, a process of forming a core by vapor-deposition of chalcogenide, and a process of forming an holographic coupler 7a by an electro beam writing on the chalcogenide by processing an interference fringe by a computer.

Instead of using the polysilicon photo-detectors 7b, 7c, 7d and 7e to detect the guided beam, where the holographic couplers are formed at the locations of the photo-detectors 7b, 7c, 7d and 7e with the holographic coupler regions being provided correspondingly to the photo-detecting sections 7ba, 7bb, 7ca and 7cb, thus allowing the beam decoupled from each of the regions to be detected at each photo-detecting section of the photo-detector of silicon, it is possible to detect signals having higher frequencies.

In the optical head of a fourth embodiment shown in FIGS. 7A and 7B, the holographic coupler 7a does not have a lens effect so that, even if the oscillation wavelength of the laser diode 1 changes, there is no deviation of the position of the focused point along the optical axis within the slab type waveguide 7. Also, since no diffraction deflection element is provided between the holographic coupler 7a and the photo-detectors 7b and 7c in the optical head of the fourth embodiment, even if the oscillation wavelength of the laser diode 1 changes, there is no movement of the focused point in the direction vertical to the optical axis within the slab type waveguide 7. Further, in the optical head of this fourth embodiment, since no utilization is made of coupling efficiency of the holographic coupler 7a that varies depending on the distance between the finite lens 2 and the optical disk 3, there is no occurrence of focus offset even if the oscillation wavelength of the laser diode 1 changes.

Figure 8A:
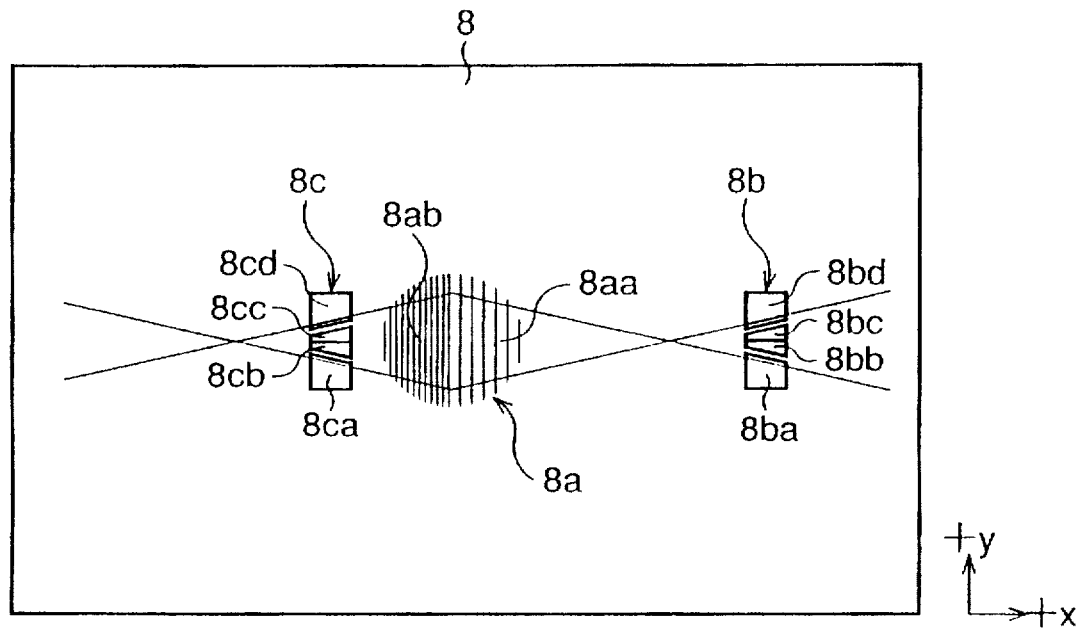
FIG. 8A is a plan view of a slab type waveguide of a fifth embodiment according to the invention.

Next, an optical head of a fifth embodiment is explained with reference to FIGS. 8A and 8B. FIG. 8A is a plan view showing a slab type waveguide which is main element of the optical head, and FIG. 8B is a front view of the optical head.

Figure 8B:
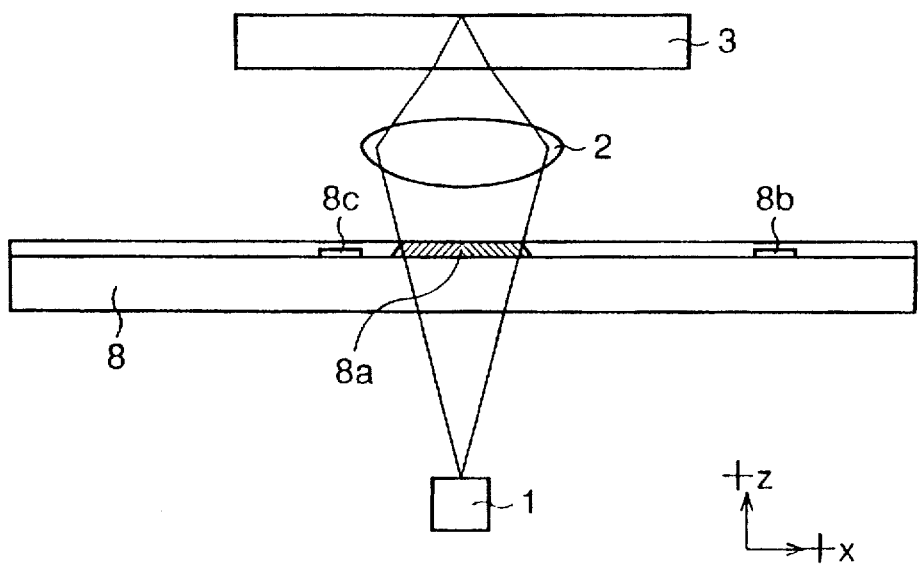
FIG. 8B is a front view of the optical head of the fifth embodiment shown in FIG. 8A.

In FIG. 8B, the beam emitted from the laser diode 1 is transmitted through the slab type waveguide 8 and focused on the optical disk 3 by the finite lens 2. The beam reflected from the optical disk 3 travels the same optical path in a reverse direction, and is coupled to the slab type waveguide 8 by the holographic coupler 8a. The holographic coupler 8a is constituted, as shown in FIG. 8A, by semi-circular regions 8aa and 8ab, totaling two semi-circular regions.

On the other hand, the beam coupled to the slab type waveguide 8 at the region 8aa is guided by the slab type waveguide 8 and is detected by a photo-detector 8b that has been formed behind the position at which the guided beam is focused when the optical disk 3 is at the objective point of the finite lens 2. The beam coupled to the slab type waveguide 8 at the region 8ab is guided by the slab type waveguide 8 and is detected by a photo-detector 8c that has been formed in front of the position at which the guided beam is focused when the optical disk 3 is at the objective point of the finite lens 2.

The photo-detector 8b and the photo-detector 8c are formed in such a way that the average value of the length of the light path from the holographic coupler 8a to the photo-detector 8b and the length of the light path from the holographic coupler 8a to the photo-detector 8c is essentially the same as the length of the light path from the holographic coupler 8a to the laser diode 1. The photo-detector 8b is constituted by photo-detecting sections 8ba, 8bb, 8bc and 8bd, the photo-detector 8c is constituted by photo-detecting sections 8ea, 8eb, 8ec and 8ed. The photo-detecting sections 8bb and 8bc constitute two divided photo-detecting sections which detect the amount of light in the vicinity of the center of the beam that is coupled to the slab type waveguide 8 at the region 8aa and is guided by the slab type waveguide 8, and the photo-detecting sections 8cb and 8cc constitute two divided photo-detection sections which detect the amount of light in the vicinity of the center of the beam that is coupled to the slab type waveguide 8 at the region 8ab is guided by the slab type waveguide 8.

Where the levels of the electrical signals photoelectrically converted at the photo-detecting sections 8ba, 8bb, 8bc, 8bd, 8ca, 8cb, 8cc and 8cd are respectively signals S8ba, S8bb, S8bc, S8bd, S8ca, S8cb, S8cc and S8cd, a focusing error signal is given as $\{S8ba-(S8bb+S8bc)+S8bd\}-\{S8ca-(S8cb+S8cc)+S8cd\}$, a tracking error signal is given as $\{(S8ba+S8bb)-(S8bc+S8bd)\}-\{(S8ca+S8cb)-(S8cc-S8cd)\}$. Also, the reproduction signals of the data signals recorded in the optical disk 3 are given as $(S8ba+S8bb+S8bc+S8bd+S8ca+S8cb+S8cc+S8cd)$.

Here, the region 8aa of the holographic coupler 8a is a region in which the interference fringe generated on the slab type waveguide 8 by the beam converged on the imaging point of the finite lens 2 and the beam guided by the slab type waveguide 8 in a +x direction and focused at the point of the light path length which equals the distance from the holographic coupler 8a to the laser diode 1, is recorded on the slab type waveguide 8 as a volume hologram. When the focused beam to be incident at the imaging point of the finite lens 2 enters the region 8aa, this region reproduces the beam which is guided by the slab type waveguide 8 in the +x direction and focused at the point of the light path length which equals the distance from the holographic coupler 8a to the laser diode 1.

The region 8ab of the holographic coupler 8a is a region in which the interference fringe generated on the slab type waveguide 8 by the beam converged on the imaging point of the finite lens 2 and the beam guided by the slab type waveguide 8 in the -x direction and focused at the point of the light path which equals the distance from the holographic coupler 8a to the laser diode 1, is recorded on the slab type waveguide 8 as a volume hologram. When the focused beam is incident at the imaging point of the finite lens 2, the region 8ab reproduces the beam which is guided by the slab type waveguide 8 in the -x direction and focused at the point of the light path which equals the distance from the holographic coupler 8a to the laser diode 1.

Even when the light scattered from the imaging point of the finite lens 2 is incident on the regions 8aa and 8ab, because the refractive index of the cladding and that of air are different from each other, the region 8aa does not reproduce the beam guided through the slab type waveguide 8 in the -x direction, the region 8ab does not reproduce the beam guided through the slab type waveguide 8 in the +x direction.

The slab type waveguide 8 is fabricated using a process of forming a cladding by optically polishing a synthetic quartz plate, a process of forming photo-detectors 8b and 8c of polysilicon, a process of forming a core by vapor-deposition of chalcogenide, and a process of forming holographic coupler 8a by electro beam writing on the chalcogenide by processing an interference fringe by a computer.

Instead of using the polysilicon photo-detectors 8b and 8c to detect the guided beam, where the holographic couplers are formed at the locations of the photo-detectors 8b and 8c with the holographic coupler regions being provided correspondingly to the photo-detecting sections 8ba, 8bb, 8bc, 8bd, 8ca, 8cb, 8cc and 8cd, thus allowing the beam decoupled from each of the regions to be detected at each photo-detecting section of the photo-detector of silicon, it is possible to detect signals having higher frequencies.

In the optical head of the fifth embodiment shown in FIGS. 8A and 8B, the holographic coupler 8a does not have a lens effect so that, even if the oscillation wavelength of the laser diode 1 changes, there is no deviation of the position of the focused point along the optical axis within the slab type waveguide 8. Also, since no diffraction deflection element is provided between the holographic coupler 8a and the photo-detectors 8b and 8c in the optical head of the fifth embodiment, even if the oscillation wavelength of the laser diode 1 changes, there is no movement of the focused point in the direction vertical to the optical axis within the slab type waveguide 8. Further, in the optical head of this fifth embodiment, since no utilization is made of the coupling efficiency of the holographic coupler 8a that varies depending on the distance between the finite lens 2 and the optical disk 3, there is no occurrence of focus offset even if the oscillation wavelength of the laser diode 1 changes.

Figure 9A:
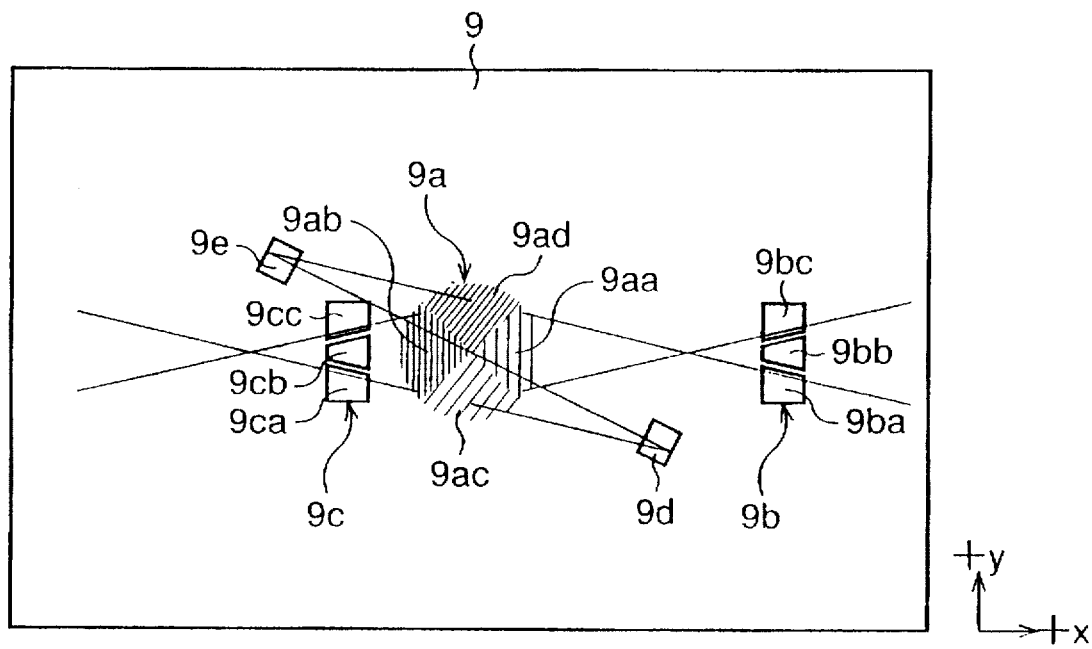
FIG. 9A is a plan view of a slab type waveguide of a sixth embodiment according to the invention.

Next, an optical head of a sixth embodiment is explained with reference to FIGS. 9A and 9B. FIG. 9A is a plan view showing a slab type waveguide which is the main element of the optical head, and FIG. 9B is a front view of the optical head.

Figure 9B:
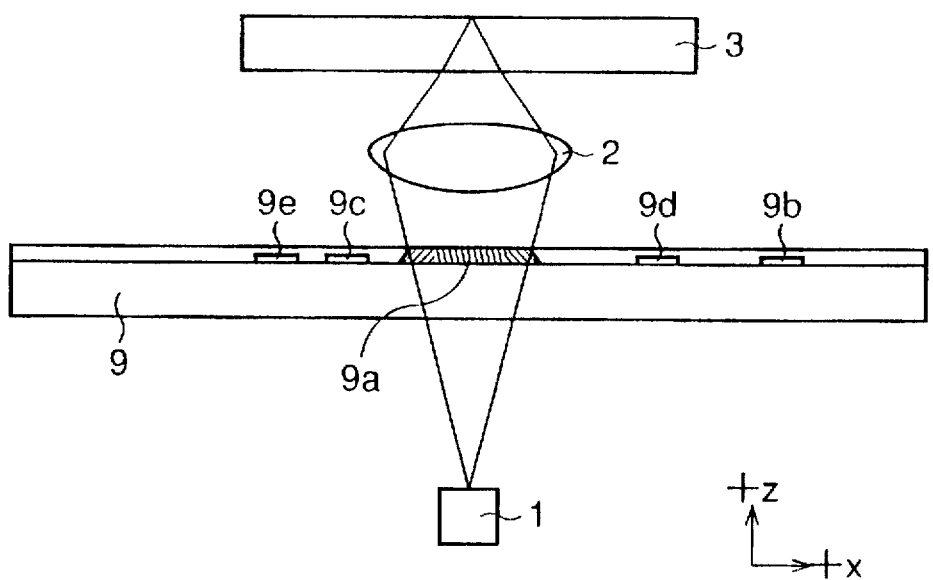
FIG. 9B is a front view of the optical head of the sixth embodiment shown in FIG. 9A.

In FIG. 9B, the beam emitted from the laser diode 1 is transmitted through the slab type waveguide 9 and focused on the optical disk 3 by the finite lens 2. The beam reflected from the optical disk 3 travels the same optical path in a reverse direction, and is coupled to the slab type waveguide 9 by the holographic coupler 9a. The holographic coupler 9a is constituted, as shown in FIG. 9A, by regions 9aa, 9ab, 9ac and 9ad, and thus includes four arcuate regions.

The beam coupled to the slab type waveguide 9 at the region 9aa is guided by the slab type wave guide 9 and is detected by a photo-detector 9b that has been formed behind the position at which the guided beam is focused when the optical disk 3 is at the objective point of the finite lens 2. The beam coupled to the slab type waveguide 9 at the region 9ab is guided by the slab type waveguide 9 and is detected by a photo-detector 9c that has been formed in front of the position at which the guided beam is focused when the optical disk 3 is at the objective point of the finite lens 2.

The photo-detector 9b and the photo-detector 9c are formed in such a way that the average value of the length of the light path from the holographic coupler 9a to the photo-detector 9b and the length of the light path from the holographic coupler 9a to the photo-detector 9c is essentially the same as the length of the light path from the holographic coupler 9a to the laser diode 1. The photo-detector 9b is constituted by a photo-detecting section 9bb which detects the amount of light in the vicinity of the center of the light that is coupled to the slab type waveguide 9 at the region 9aa and is guided through the slab type waveguide 9 and photo-detecting sections 9ba and 9bc which detect the amount of light at the two sides of the guided beam. Also, the photo-detector 9c is constituted by a photo-detecting section 9cb which is coupled to the slab type waveguide 9 at the region 9ab and detects the amount of light in the vicinity of the center of the light that is guided through the slab type waveguide 9 and photo-detecting sections 9ca and 9cc which detect the amount of light at the two sides of the guided beam.

The beam coupled to the slab type waveguide 9 at the region 9ac of the holographic coupler 9a is guided by the slab type waveguide 9 and is detected by a photo-detector 9d. Also, the beam coupled to the slab type waveguide 9 at the region 9ad of the holographic coupler 9a is guided by the slab type waveguide 9 and is detected by a photo-detector 9e.

Where the levels of the electrical signals photoelectrically converted at the photo-detecting sections 9ba, 9bb, 9bc, 9ca, 9cb and 9cc are respectively signals S9ba, S9bb, S9bc, S9ca, S9cb and S9cc, a focusing error signal is given as {(S9ba−S9bb+S9bc)−(S9ca−S9cb+S9cc)}. Also, where the levels of the electrical signal as photoelectrically converted at the photo-detectors 9d and 9e are respectively signals S9d and S9e, a tracking error signal is given as (S9d−S9e). Further, the reproduction signals of the data signals recorded in the optical disk 3 are given as (S9ba+S9bb+S9bc+S9ca+S9cb+S9cc+S9d+S9e).

Here, the region 9aa of the holographic coupler 9a is a region in which the interference fringe generated on the slab type waveguide 9 by the beam converged on the imaging point of the finite lens 2 and the beam guided by the slab type waveguide 9 in the +x direction and focused at the point of the light path length which equals the distance from the holographic coupler 9a to the laser diode 1, is recorded on the slab type waveguide 9 as a volume hologram. When the focused beam to be incident at the imaging point of the finite lens 2 enters the region 9aa, this region reproduces the beam which is guided by the slab type waveguide 9 in the +x direction and focused at the point of the light path length which equals the distance from the holographic coupler 9a to the laser diode 1.

The region 9ab of the holographic coupler 9a is a region in which the interference fringe generated on the slab type waveguide 9 by the beam converged on the object point of the finite lens 2 and the beam guided by the slab type waveguide 9 in the −x direction and focused at the point of the light path length which equals the distance from the holographic coupler 9a to the laser diode 1, is recorded on the slab type waveguide 9 as a volume hologram. When the focused beam to be incident at the imaging point of the finite lens 2 enters the region 9ab, this region reproduces the beam which is guided by the slab type waveguide 9 in the −x direction and focused at the point of the light path length which equals the distance from the holographic coupler 9a to the laser diode 1.

The region 9ac of the holographic coupler 9a is a region in which the interference fringe generated on the slab type waveguide 9 by the beam converged on the imaging point of the finite lens 2 and the beam guided by the slab type waveguide 9 from the region 9ac to the center of the photo-detector 9d, is recorded on the slab type waveguide 9 as a volume hologram. When the focused beam to be incident at the imaging point of the finite lens 2 enters the region 9ac, this region reproduces the beam guided by the slab type waveguide 9 from the region 9ac to the center of the photo-detector 9d.

The region 9ad of the holographic coupler 9a is a region in which the interference fringe generated on the slab type waveguide 9 by the beam converged on the imaging point of the finite lens 2 and the beam guided by the slab type waveguide 9 from the region 9ad to the center of the photo-detector 9e, is recorded on the slab type waveguide 9 as a volume hologram. When the focused beam is incident at the imaging point of the finite lens 2, the region 9ad reproduces the beam guided from the region 9ad by the slab type waveguide 9 to the center of the photo-detector 9e.

Even when the light scattered from the imaging point of the finite lens 2 is incident on the regions 9aa, 9ab, 9ac and 9ad, because the refractive index of the cladding and that of air are different from each other, the region 9aa does not reproduce the beam guided in the direction −x through the slab type waveguide 9, the region 9ab does not reproduce the beam guided in the direction of +x through the slab type waveguide 9, the region 9ac does not reproduce the beam guided in the direction from the center of the photo-detector 9d to the region 9ac through the slab type waveguide 9, and the region 9ad does not reproduce the beam guided in the direction from the center of the photo-detector 9e to the region 9ad through the slab type waveguide 9.

The slab type waveguide 9 is fabricated using a process of forming a cladding by optically polishing a synthetic quartz plate, a process of forming photo-detectors 9b, 9c, 9d and 9e of polysilicon, a process of forming a core by vapor-deposition of chalcogenide, and a process of forming an holographic coupler 9a by an electro-beam writing on the chalcogenide by processing an interference fringe by a computer.

Instead of using the polysilicon photo-detectors 9b, 9c, 9d and 9e to detect the guided beam, where the holographic couplers are formed at the locations of the photo-detectors 9b, 9c, 9d and 9e with the holographic coupler regions being provided correspondingly to the photo-detecting sections 9ba, 9bb, 9bc, 9ca, 9cb and 9cc, thus allowing the beam decoupled from each of the regions to be detected at each photo-detecting section of the photo-detector of silicon, it is possible to detect signals having higher frequencies.

In the optical head of the sixth embodiment shown in FIGS. 9A and 9B, the holographic coupler 9a does not have a lens effect so that, even if the oscillation wavelength of the laser diode 1 changes, there is no deviation of the position of the focused point along the optical axis within the slab type waveguide 9. Also, since no diffraction deflection element is provided between the holographic coupler 9a and the photo-detectors 9b and 9c in the optical head of the sixth embodiment, even if the oscillation wavelength of the laser diode 1 changes, there is no movement of the focused point in the direction vertical to the optical axis within the slab type waveguide 9. Further, in the optical head of this sixth embodiment, since no utilization is made of the coupling efficiency of the holographic coupler 9a that varies depending on the distance between the finite lens 2 and the optical disk 3, there is no occurrence of focus offset even if the oscillation wavelength of the laser diode 1 changes.

Figure 10A:
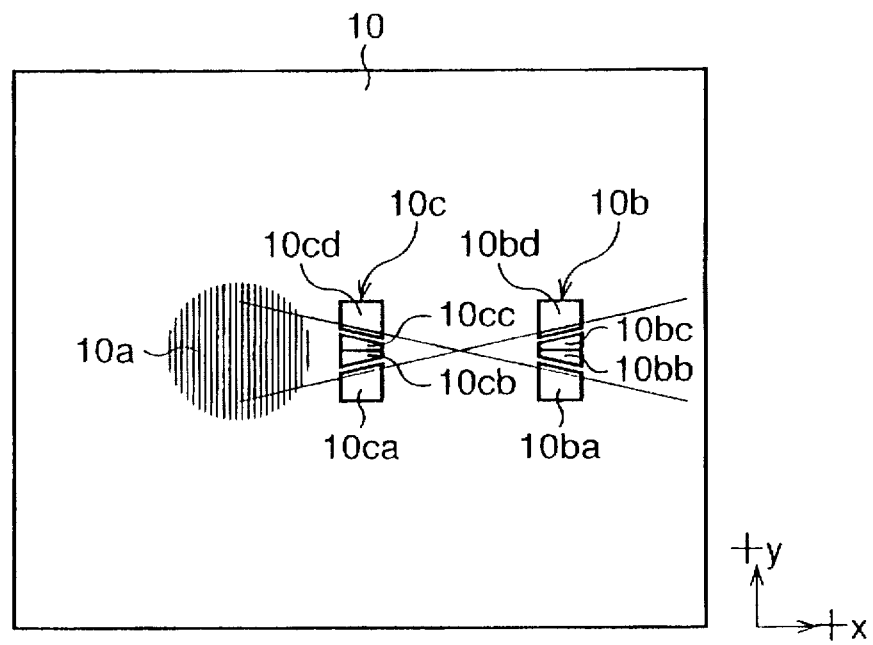
FIG. 10A is a plan view of a slab type waveguide of a seventh embodiment according to the invention.

Next, an optical head of a seventh embodiment is explained with reference to FIGS. 10A and 10B. FIG. 10A is a plan view showing a slab type waveguide which is a main element of the optical head, and FIG. 10B is a front view of the optical head.

Figure 10B:
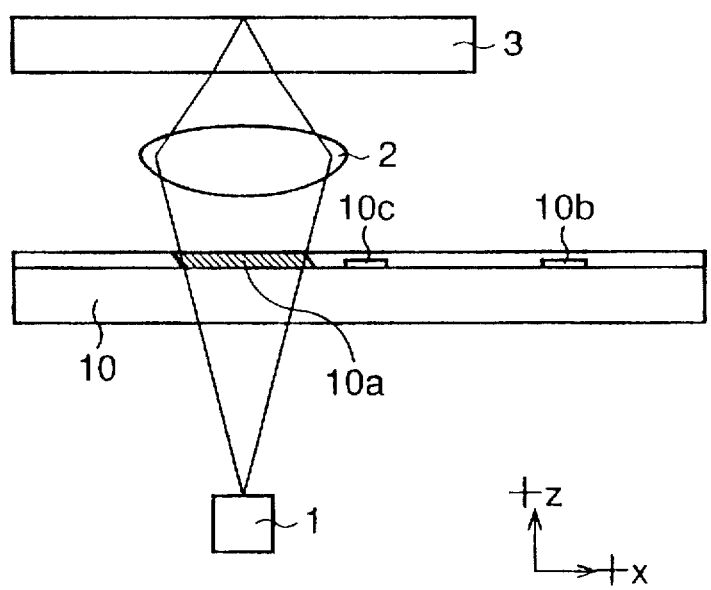
FIG. 10B is a front view of the optical head of the seventh embodiment shown in FIG. 10A.

In FIG. 10B, the beam emitted from the laser diode 1 is transmitted through the slab type waveguide 10 and focused on the optical disk by the finite lens 2. The beam reflected from the optical disk 3 travels the same optical path in a reverse direction, and is coupled to the slab type waveguide 10 by the holographic coupler 10a.

The beam guided by the slab type waveguide 10 is detected, as shown in FIG. 10A, by a photo-detector 10b which is formed behind the position at which the guided beam is focused when the optical disk 3 is at the objective point of the finite lens 2, and a photo-detector 10c which is formed in front of the position at which the guided beam is focused when the optical disk 3 is at the objective point of the finite lens 2.

The photo-detector 10b converts all of the guided beam detected to electrical signals, but the photo-detector 10c converts half of such guided wave light to electrical signals, allowing the remaining to be transmitted. The photo-detector 10b and the photo-detector 10c are formed such that the light path length from the center of the photo-detector 10b and the photo-detector 10c to the holographic coupler 10a equals the optical path length from the laser diode 1 to the holographic coupler 10a. The photo-detector 10b is constituted by photo-detecting sections 10ba, 10bb, 10bc and 10bd, and the photo-detector 10c is constituted by photo-detecting sections 10ca, 10cb, 10cc and 10cd.

The photo-detecting sections 10bb and 10bc constitute two divided photo-detecting sections which detect the amount of light in the vicinity of the center of the beam that is coupled to the slab type waveguide 10 at the holographic coupler 10a and is guided by the slab type waveguide 10, and the photo-detecting sections 10cb and 10cc constitute two divided photo-detection sections which detect the amount of light in the vicinity of the center of the beam that is coupled to the slab type waveguide 10 at the holographic coupler 10a and is guided by the slab type waveguide 10.

Where the levels of the electrical signals photoelectrically converted at the photo-detecting sections 10ba, 10bb, 10bc, 10bd, 10ca, 10cb, 10cc and 10cd are respectively signals S10ba, S10bb, S10bc, S10bd, S10ca, S10cb, S10cc and S10cd, a focusing error signal is given as [{S10ba−(S10bb+S10bc)+S10bd}−{S10ca−(S10cb+S10cc)+S10cd}]. Also, a tracking error signal is given as [{(S10ba+S10bb)−(S10bc+S10bd)}−{(S10ca+S10cb)−(S10cc+S10cd)}]. Further, the reproduction signals of the data signals recorded in the optical disk 3 are given as (S10ba+S10bb+S10bc+S10bd+S10ca+S10cb +S10cc+S10cd).

Here, in the holographic coupler 10a, the interference fringe generated on the slab type waveguide 10 by the beam which is converged on the imaging point of the finite lens 2 and the beam which is guided by the slab type waveguide 10 in a +x direction and focused at the center of the photo-detector 10b and the photo-detector 10c, is recorded on the slab type waveguide 10 as a volume hologram. When the focused beam to be incident at the imaging point of the finite lens 2 enters the holographic coupler 10a, this region reproduces the beam which is guided by the slab type waveguide 10 in the +x direction and focused at the center of the photo-detector 10b and photo-detector 10c.

Even when the light scattered from the imaging point of the finite lens 2 is incident on the holographic coupler 10a, because the refractive index of the cladding and that of air are different from each other, the holographic coupler does not reproduce the beam guided through the slab type waveguide 10 in the −x direction.

The slab type waveguide 10 is fabricated using a process of forming a cladding by optically polishing a synthetic quartz plate, a process of forming photo-detectors 10b and 10c of polysilicon, a process of forming a core by vapor-deposition of chalcogenide, and a process of forming an holographic coupler 10a by an electro beam writing on the chalcogenide by processing an interference fringe by a computer.

Instead of using the polysilicon photo-detectors 10b and 10c to detect the guided beam, where the holographic couplers are formed at the locations of the photo-detectors 10b and 10c with the holographic coupler regions being provided correspondingly to the photo-detecting sections 10ba, 10bb, 10bc, 10bd, 10ca, 10cb, 10cc and 10cd, thus allowing the beam decoupled from each of the regions to be detected at each photo-detecting section of the photo-detector of silicon, it is possible to detect signals having higher frequencies. In such a case, it is arranged such that the holographic coupler provided at the position of the photo-detector 10b decouples all of the guided beam, but the hologram provided at the position of the photo-detector 10c decouples half of the guided beam, thus allowing the remaining light to be transmitted.

In the optical head of the seventh embodiment shown in FIGS. 10A and 10B, the holographic coupler 10a does not have a lens effect so that, even if the oscillation wavelength of the laser diode 1 changes, there is no deviation of the position of the focused point along the optical axis within the slab type waveguide 10. Also, since no diffraction deflection element is provided between the holographic coupler 10a and the photo-detectors 10b and 10c in the optical head of this seventh embodiment, even if the oscillation wavelength of the laser diode 1 changes, there is no movement of the focused point in the direction vertical to the optical axis within the slab type waveguide 10. Further, in the optical head of this seventh embodiment, since no utilization is made of the coupling efficiency of the holographic coupler 10a that varies depending on the distance between the finite lens 2 and the optical disk 3, there is no occurrence of focus offset even if the oscillation wavelength of the laser diode 1 changes.

Figure 11A:
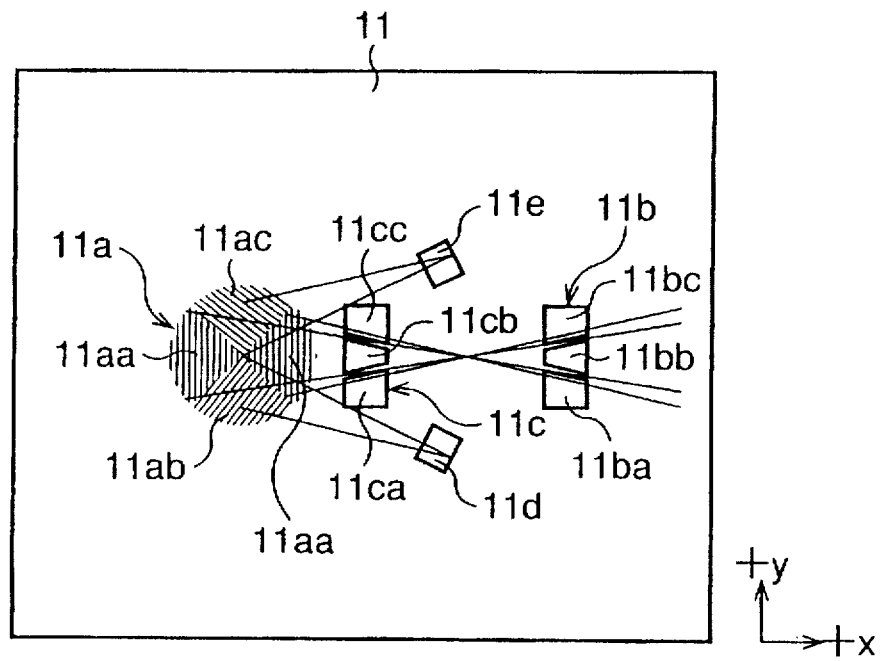
FIG. 11A is a plan view of a slab type waveguide of an eighth embodiment according to the invention.

Next, an optical head of an eighth embodiment is explained with reference to FIGS. 11A and 11B. FIG. 11A is a plan view showing a slab type waveguide which is a main element of the optical head, and FIG. 11B is a front view of the optical head.

Figure 11B:
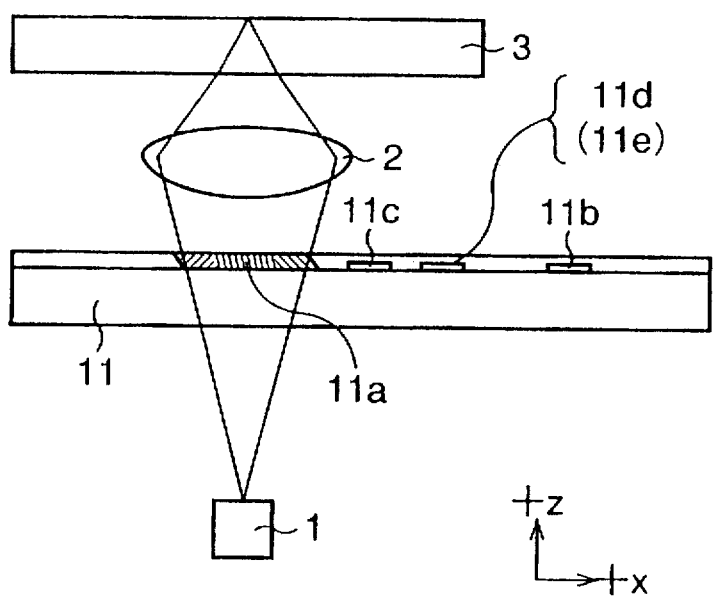
FIG. 11B is a front view of the optical head of the eighth embodiment shown in FIG. 11A.

In FIG. 11B, the beam emitted from the laser diode 1 is transmitted through the slab type waveguide 11 and focused on the optical disk 3 by the finite lens 2. The beam reflected from the optical disk 3 travels the same optical path in a reverse direction, and is coupled to the slab type waveguide 11 by the holographic coupler 11a. The holographic coupler 11a is constituted, as shown in FIG. 11A, by regions 11aa, 11aa, 11ab and 11ac, and thus includes four arcuate regions.

The beam coupled to the slab type waveguide 11 at the region 11aa is guided by the slab type waveguide 11 and is detected by a photo-detector 11b that has been formed behind the position at which the guided beam is focused when the optical disk 3 is at the imaging point of the finite lens 2, and is detected by a photo-detector 11c that has been formed in front of the position at which the guided beam is focused when the optical disk 3 is at the objective point of the finite lens 2.

The photo-detector 11b converts all of the guided beam detected to electrical signals, but the photo-detector 11c converts half of such guided wave light to electrical signals, allowing the remaining to be transmitted. The photo-detector 11b and the photo-detector 11c are formed such that the light path length from the center of the photo-detector 11b and the photo-detector 11c to the holographic coupler 11a equals the optical path length from the laser diode 1 to the holographic coupler 11a.

The beam coupled to the slab type waveguide 11 at the region 11ab of the holographic coupler 11a is guided by the slab type wave guide 11 and detected by the photo-detector 11d. Further, the beam coupled to the slab type waveguide 11 at the region 11ac of the holographic coupler 11a is guided by the slab type wave guide 11 and detected by the photo-detector 11e.

The photo-detector 11b is constituted by a photo-detecting section 11bb which is coupled to the slab type waveguide 11 at the region 11aa and detects the amount of light in the vicinity of the center of the light that is guided through the slab type waveguide 11 and photo-detecting sections 11ba and 11bc which detect the amount of light at the two sides of the guided beam. Also, the photo-detector 11c is constituted by a photo-detecting section 11cb which is coupled to the slab type waveguide 11 at the region 11aa and detects the amount of light in the vicinity of the center of the light that is guided through the slab type waveguide 11 and photo-detecting sections 11ca and 11cc which detect the amount of light at the two sides of the guided beam.

Where the levels of the electrical signals photoelectrically converted at the photo-detecting sections 11ba, 11bb, 11bc, 11ca, 11cb and 11cc are respectively signals S11ba, S11bb, S11bc, S11ca, S11cb and S11cc, a focusing error signal is given as $\{(S11ba-S11bb+S11bc)-(S11ca-S11cb+S11cc)\}$. Also, where the levels of the electrical signals as photoelectrically converted at the photo-detectors 11d and 11e are respectively signals S11d and S11e, a tracking error signal is given as $(S11ba-S11e)$. Further, the reproduction signals of the data signals recorded in the optical disk 3 are given as $(S11ba+S11bb+S11bc+S11ca+S11cb+S11cc+S11d+S11e)$.

Here, the region 11aa of the holographic coupler 11a is a region in which the interference fringe generated on the slab type waveguide 11 by the beam which is converged on the imaging point of the finite lens 2 and the beam which is guided by the slab type waveguide 11 in a +x direction and focused at the center of the photo-detector 11b and the photo-detector 11c, is recorded on the slab type waveguide 11 as a volume hologram. When the focused beam to be incident at the imaging point of the finite lens 2 enters the region 11aa, this region reproduces the beam which is guided by the slab type waveguide 11 in the +x direction and focused at the center of the photo-detector 11b and photo-detector 11c.

The region 11ac of the holographic coupler 11a is a region in which the interference fringe generated on the slab type waveguide 11 by the beam converged on the imaging point of the finite lens 2 and the beam guided by the slab type waveguide 11 from the region 11ab to the center of the photo-detector 11d, is recorded on the slab type waveguide 11 as a volume hologram. When the focused beam to be incident at the imaging point of the finite lens 2 enters the region 11ab, this region reproduces the beam guided by the slab type waveguide 11 from the region 11ab to the center of the photo-detector 11d.

The region 11ac of the holographic coupler 11a is a region in which the interference fringe generated on the slab type waveguide 11 by the beam converged on the objective point of the finite lens 2 and the beam guided by the slab type waveguide 11 from the region 11ac to the center of the photo-detector 11e, is recorded on the slab type waveguide 11 as a volume hologram. When the focused beam to be incident at the imaging point of the finite lens 2 enters the region 11ac, this region reproduces the beam guided from the region 11ac by the slab type waveguide 11 to the center of the photo-detector 11e.

Even when the light scattered from the imaging point of the finite lens 2 is incident on each of the regions of the holographic coupler 11a, because the refractive index of the cladding and that of air are different from each other, the region 11aa does not reproduce the beam guided in the direction −x through the slab type waveguide 11, the region 11ab does not reproduce the beam guided in the direction from the center of the photo-detector 11d to the region 11ac through the slab type waveguide 11, the region 11ab does not reproduce the beam guided in the direction from the center of the photo-detector 11e to the region 11ac through the slab type waveguide 11.

The slab type waveguide 11 is fabricated using a process of forming a cladding by optically polishing a synthetic quartz plate, a process of forming photo-detectors 11b, 11c, 11d and 11e of polysilicon, a process of forming a core by vapor-deposition of chalcogenide, and a process of forming an holographic coupler 11a by an electro-beam writing on the chalcogenide by processing an interference fringe by a computer.

Instead of using the polysilicon photo-detectors 11b, 11c, 11d and 11e to detect the guided beam, where the holographic couplers are formed at the locations of the photo-detectors 11b, 11c, 11d and 11e with the holographic coupler regions being provided correspondingly to the photo-detecting sections 11ba, 11bb, 11bc, 11ca, 11cb and 11cc, thus allowing the beam decoupled from each of the regions to be detected at each photo-detecting section of the photo-detector of silicon, it is possible to detect signals having higher frequencies. In such a case, the holographic coupler provided at the position of the photo-detector 11b decouples all of the guided beam, but the holographic coupler provided at the position of the photo-detector 11c decouples half of the guided beam, thus allowing the remaining light to be transmitted.

In the optical head of the eighth embodiment shown in FIGS. 11A and 11B, the holographic coupler 11a does not have a lens effect so that, even if the oscillation wavelength of the laser diode 1 changes, there is no deviation of the position of the focused point along the optical axis within the slab type waveguide 11. Also, since no diffraction deflection element is provided between the holographic coupler 11a and the photo-detectors 11b and 11c in the optical head of this eighth embodiment, even if the oscillation wavelength of the laser diode 1 changes, there is no movement of the focused point in the direction vertical to the optical axis within the slab type waveguide 11. Further, in the optical head of this eighth embodiment, since no utilization is made of the coupling efficiency of the holographic coupler 11a that varies depending on the distance between the finite lens 2 and the optical disk 3, there is no occurrence of focus offset even if the oscillation wavelength of the laser diode 1 changes.

Figure 12A:
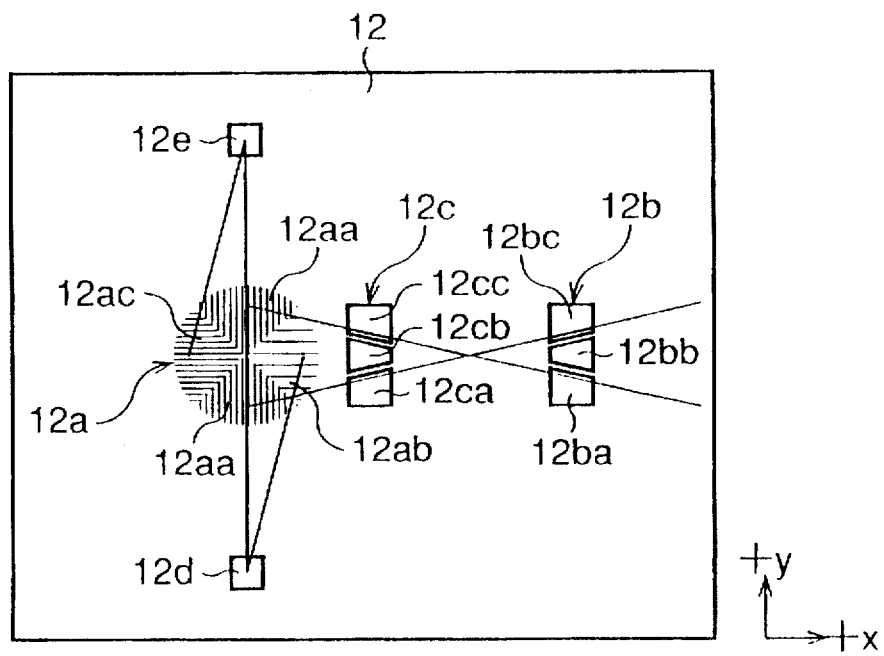
FIG. 12A is a plan view of a slab type waveguide of a ninth embodiment according to the invention.

Next, an optical head of a ninth embodiment is explained with reference to FIGS. 12A and 12B. FIG. 12A is a plan view showing a slab type waveguide which is the main element of the optical head, and FIG. 12B is a front view of the optical head.

Figure 12B:
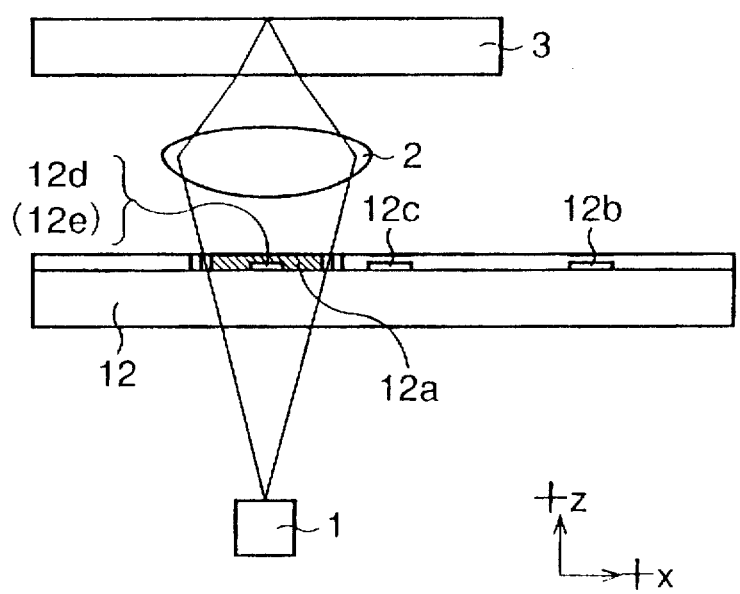
FIG. 12B is a front view of the optical head of the ninth embodiment shown in FIG. 12A.

In FIG. 12B, the beam emitted from the laser diode 1 is transmitted through the slab type waveguide 12 and focused on the optical disk 3 by the finite lens 2. The beam reflected from the optical disk 3 travels the same optical path in a reverse direction, and is coupled to the slab type waveguide 12 by the holographic coupler 12a. The holographic coupler 12a is constituted, as shown in FIG. 12A, by regions 12aa, 12aa, 12ab and 12ac, and thus includes a total of four arcuate regions.

The beam coupled to the slab type waveguide 12 at the two regions 12aa is guided by the slab type waveguide 12 and is detected by a photo-detector 12b that has been formed behind the position at which the guided beam is focused when the optical disk 3 is at the objective point of the finite lens 2, and is detected by a photo-detector 12c that has been formed in front of the position at which the guided beam is focused when the optical disk 3 is at the objective point of the finite lens 2.

The photo-detector 12b converts all of the guided beam detected into electrical signals, but the photo-detector 12c converts half of such wave guided light into electrical signals, allowing the remaining to be transmitted. The photo-detector 12b and the photo-detector 12c are formed such that the light path length from the center of the photo-detector 12b and the photo-detector 12c to the holographic coupler 12a equals the optical path length from the laser diode 1 to the holographic coupler 12a.

The photo-detector 12b is constituted by a photo-detecting section 12bb which is coupled to the slab type waveguide 12 at the region 12aa and detects the amount of light in the vicinity of the center of the light that is guided through the slab type waveguide 12 and photo-detecting sections 12ba and 12bc which detect the amount of light at the two sides of the guided beam. Also, the photo-detector 12c is constituted by a photo-detecting section 12cb which is coupled to the slab type waveguide 12 at the region 12aa and detects the amount of light in the vicinity of the center of the light that is guided through the slab type waveguide 12 and photo-detecting sections 12ca and 12cc which detect the amount of light at the two sides of the guided beam.

Also, the beam coupled to the slab type waveguide 12 at the region 12ab of the holographic coupler 12a is guided by the slab type waveguide 12 and detected by the photo-detector 12d. Further, the beam coupled to the slab type waveguide 12 at the region 12ac of the holographic coupler 12a is guided by the slab type waveguide 12 and detected by the photo-detector 12e.

Where the levels of the electrical signals photoelectrically converted at the photo-detecting sections 12ba, 12bb, 12bc, 12ca, 12cd and 12cc are respectively signals S12ba, S12bb, S12bc, S12ca, S12cb and S12cc, a focusing error signal is given as $\{(S12ba-S12bb+S12bc)-(S12ca-S12cb-S12cc)\}$. Also, where the levels of the electrical signals photoelectrically converted at the photo-detectors 12d and 12e are respectively signals S12d and S12e, a tracking error signal is given as $(S12d-S12e)$. Further, the reproduction signals of the data signals recorded in the optical disk 3 are given as $(S12ba+S12bb+S12bc+S12ca+S12cb+S12cc+S12d+S12e)$.

Here, the region 12aa of the holographic coupler 12a is a region in which the interference fringe generated on the slab type waveguide 12 by the beam which is converged on the imaging point of the finite lens 2 and the beam which is guided by the slab type waveguide 12 in a +x direction and focused at the center of the photo-detector 12b and the photo-detector 12c, is recorded on the slab type waveguide 12 as a volume hologram. When the focused beam to be incident at the imaging point of the finite lens 2 enters the region 12aa, this region reproduces the beam which is guided by the slab type waveguide 12 in the +x direction and focused at the center of the photo-detector 12b and photo-detector 12c.

The region 12ab of the holographic coupler 12a is a region in which the interference fringe generated on the slab type waveguide 12 by the beam converged on the imaging point of the finite lens 2 and the beam guided by the slab type waveguide 12 from the region 12ab to the center of the photo-detector 12d, is recorded on the slab type waveguide 12 as a volume hologram. When the focused beam to be incident at the imaging point of the finite lens 2 enters the region 12ab, this region reproduces the beam guided by the slab type waveguide 12 from the region 12ab to the center of the photo-detector 12d.

The region 12ac of the holographic coupler 12a is a region in which the interference fringe generated on the slab type waveguide 12 by the beam converged on the imaging point of the finite lens 2 and the beam guided by the slab type waveguide 12 from the region 12ac to the center of the photo-detector 12e, is recorded on the slab type waveguide 12 as a volume hologram. When the focused beam to be incident at the imaging point of the finite lens 2 enters the region 12ac, this region reproduces the beam guided from the region 12ac by the slab type waveguide 12 to the center of the photo-detector 12e.

Even when the light scattered from the imaging point of the finite lens 2 is incident on each of the regions of the holographic coupler 12a, because the refractive index of the cladding and that of air are different from each other, the region 12aa does not reproduce the beam guided in the direction −x through the slab type waveguide 12, the region 12ab does not reproduce the beam guided in the direction +y through the slab type waveguide 12, and the region 12ac does not reproduce the beam guided in the direction −y through the slab type waveguide 12.

The slab type waveguide 12 is fabricated using a process of forming a cladding by optically polishing a synthetic quartz plate, a process of forming photo-detectors 12b, 12c, 12d and 12e of polysilicon, a process of forming a core by vapor-deposition of chalcogenide, and a process of forming an holographic coupler 12a by an electro-beam writing on the chalcogenide by processing an interference fringe by a computer.

Instead of using the polysilicon photo-detectors 12b, 12c, 12d and 12e to detect the guided beam, where the holographic couplers are formed at the locations of the photo-detectors 12b, 12c, 12d and 12e with the holographic coupler regions being provided correspondingly to the photo-detecting sections 12ba, 12bb, 12bc, 12ca, 12cb and 12cc, thus allowing the beam decoupled from each of the regions to be detected at each photo-detecting section of the photo-detector of silicon, it is possible to detect signals having higher frequencies. In such a case, the holographic coupler provided at the position of the photo-detector 12b decouples all of the guided beam, but the holographic coupler provided at the position of the photo-detector 12c decouples half of the guided beam, thus allowing the remaining light to be transmitted.

In the optical head of the ninth embodiment shown in FIGS. 12A and 12B, the holographic coupler 12a does not have a lens effect as is the case with the first to eighth embodiments so that, even if the oscillation wavelength of the laser diode 1 changes, there is no deviation of the position of the focused point along the optical axis within the slab type waveguide 12. Also, since no diffraction deflection element is provided between the holographic coupler 12a and the photo-detectors 12b and 12c in the optical head of this ninth embodiment, even if the oscillation wavelength of the laser diode 1 changes, there is no movement of the focused point in the direction vertical to the optical axis within the slab type waveguide 12. Further, in the optical head of this ninth embodiment, since no utilization is made of the coupling efficiency of the holographic coupler 12a that varies depending on the distance between the finite lens 2 and the optical disk 3, there is no occurrence of focus offset even if the oscillation wavelength of the laser diode 1 changes.

The invention is not limited to the above described embodiments as, for example, the finite lens 2 may be replaced by a converging lens formed by a combination of collimating lenses.

Thus, while the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical head comprising a radiating light source for emitting a beam, a converging lens for focusing said beam onto a recording medium, and a slab type waveguide for guiding light, said optical head also comprising:

a holographic coupler lacking a lens effect, which is provided in said slab type waveguide between said radiating light source and said converging lens, said holographic coupler being for transmitting an uncollimated radiating beam originating from said radiating light source toward said converging lens and diffracting a beam returning from said converging lens toward said radiating light source after being reflected at said recording medium said slab type waveguide being disposed in the uncollimated radiating beam; and a plurality of photo-detectors which detect said beam that is diffracted by said holographic coupler and is coupled to and guided through said slab type waveguide.

2. An optical head according to claim 1, in which said holographic coupler includes a first region and a second region which are symmetrical with respect to an optical axis of the returning beam, and said plurality of photo-detectors include at least a first photo-detector for detecting a first beam coupled to said slab type waveguide at said first region and guided by said slab type waveguide and a second photo-detector for detecting a second beam coupled to said slab type waveguide at said second region and guided by said slab type waveguide, said first beam being positioned at one of two sides with respect to said optical axis and said second beam being positioned at the other of said two sides, said first photo-detector comprising a first photo-detecting section which is provided at a position where said first beam is focused when said recording medium is at an objective point of said converging lens and which detects an amount of light at the same side as said first region with respect to an optical axis of said first beam, and a second photo-detecting section which detects an amount of light at an opposite side of said first region with respect to the optical axis of said first beam; and said second photo-detector comprising a third photo-detecting section which is provided at a position where said second beam is focused when said recording medium is at an objective point of said converging lens and which detects an amount of light at the same side as said second region with respect to an optical axis of said second beam, and a fourth photo-detecting section which detects an amount of light at an opposite side of said second region with respect to the optical axis of said second beam, whereby when output signals of said first, second, third and fourth photo-detecting sections are respectively S1, S2, S3 and S4, a focusing error signal is given as (S1 35−S2)+(S3−S4).

3. An optical head according to claim 2, in which said first photo-detector and said second photo-detector are constituted by holographic couplers having regions corresponding to said first photo-detecting section, said second photo-detecting section, said third photo-detecting section and said fourth photo-detecting section, said holographic couplers being structured such that a beam decoupled from each of said regions is inputted to a photoelectric converting means.

4. An optical head according to claim 1, in which said plurality of photo-detectors include at least a first photo-detector and a second photo-detector for detecting said beam guided by said slab type waveguide, said first photo-detector being provided behind a position where the guided beam is focused when said recording medium is at an objective point of said converging lens, and comprising a first photo-detecting section which detects an amount of light in a vicinity of a center of one of left-hand and right-hand sides of optical axis of the guided beam, and a second photo-detecting section which detects an amount of light outside of one of the left-hand and right-hand sides of the optical axis of the guided beam; and said second photo-detector being provided behind a position where the guided beam is focused when said recording medium is at an objective point of said converging lens, and comprising a third photo-detecting section which detects an amount of light in a vicinity of the center of one of the left-hand and right-hand sides of the optical axis of the guided beam, and a fourth photo-detecting section which detects an amount of light outside of one of the left-hand and right-hand sides of the optical axis of the guided beam, whereby when output signals of said first, second, third and fourth photo-detecting sections are respectively S1, S2, S3 and S4, a focusing error signal is given as (S1–S2)–(S3–S4).

5. An optical head according to claim 4, in which said first photo-detector and said second photo-detector are constituted by holographic couplers having regions corresponding to said first photo-detecting section, said second photo-detecting section, said third photo-detecting section and said fourth photo-detecting section, said holographic couplers being structured such that a beam decoupled from each of said regions is inputted to a photoelectric converting means.

6. An optical head according to claim 1, in which said holographic coupler includes a first region and a second region which are symmetrical with respect to an optical axis of the returning beam, and said plurality of photo-detectors include at least a first photo-detector for detecting a first beam coupled to said slab type waveguide at said first region and guided by said slab type waveguide, and a second photo-detector for detecting a second beam coupled to said slab type waveguide at said second region and guided by said slab type waveguide, said first photo-detector being provided behind a position where the guided beam is focused when said recording medium is at an objective point of said converging lens, and comprising a first photo-detecting section which detects an amount of light in a vicinity of a center of said first beam, a second photo-detecting section which detects an amount of light at a left-hand side of said first beam, and a third photo-detecting section which detects an amount of light at a right-hand side of said first beam;

said second photo-detector being provided in front of a position where the guided beam is focused when said recording medium is at an objective point of said converging lens, and comprising a fourth photo-detecting section which detects an amount of light in a vicinity of a center of said second beam, a fifth photo-detecting section which detects an amount of light at a left-hand side of said second beam, and a sixth photo-detecting section which detects an amount of light at a right-hand side of said second beam, whereby when output signals of said first, second, third, fourth, fifth and sixth photo-detecting sections are respectively S1, S2, S3, S4, S5 and S6, a focusing error signal is given as {S4–(S5+S6)}–{S1–(S2+S3)}.

7. An optical head according to claim 6, in which said first photo-detector and said second photo-detector are constituted by holographic couplers having regions corresponding to said first photo-detecting section, said second photo-detecting section, said third photo-detecting section, said fourth photo-detecting section, said fifth photo-detecting section and said sixth photo-detecting section, said holographic couplers being structured such that a beam decoupled from each of said regions is inputted to a photoelectric converting means.

8. An optical head according to claim 6, in which each of said first photo-detecting section and said fourth photo-detecting section is constituted by two photo-detecting sections each divided into two portions.

9. An optical head according to claim 1, in which said holographic coupler includes a first region and a second region which are symmetrical with respect to an optical axis of the returning beam, and said plurality of photo-detectors include at least a first photo-detector for detecting a first beam coupled to said slab type waveguide at said first region and guided by said slab type waveguide, and a second photo-detector for detecting a second beam coupled to said slab type waveguide at said second region and guided by said slab type waveguide, said first photo-detector being provided behind a position where the guided beam is focused when said recording medium is at an objective point of said converging lens, and comprising a first photo-detecting section which detects an amount of light in a vicinity of a center of the guided beam, a second photo-detecting section which detects an amount of light at a left-hand side of the guided beam, and a third photo-detecting section which detects an amount of light at a right-hand side of the guided beam;

said second photo-detector being provided in front of a position where the guided beam is focused when said recording medium is at an objective point of said converging lens, and comprising a fourth photo-detecting section which detects an amount of light in a vicinity of the center of the guided beam, a fifth photo-detecting section which detects an amount of light at the left-hand side of the guided beam, and a sixth photo-detecting section which detects an amount of light at the right-hand side of the guided beam, whereby when output signals of said first, second, third, fourth, fifth and sixth photo-detecting sections are respectively S1, S2, S3, S4, S5 and S6, a focusing error signal is given as {S4–(S5+S6)}–{S1–(S2+S3)}.

10. An optical head according to claim 9, in which said first photo-detector and said second photo-detector are constituted by holographic couplers having regions corresponding to said first photo-detecting section, said second photo-detecting section, said third photo-detecting section, said fourth photo-detecting section, said fifth photo-detecting section and said sixth photo-detecting section, said holographic couplers being structured such that a beam decoupled from each of said regions is inputted to a photoelectric converting means.

11. An optical head according to claim 9, in which each of said first photo-detecting section and said fourth photo-detecting section is constituted by two photo-detecting sections each divided into two portions.

* * * * *